(12) United States Patent
Yoneyama et al.

(10) Patent No.: US 7,527,862 B2
(45) Date of Patent: May 5, 2009

(54) DYES FOR ANISOTROPIC DYE FILMS, DYE COMPOSITIONS FOR ANISOTROPIC DYE FILMS, ANISOTROPIC DYE FILMS AND POLARIZING ELEMENTS

(75) Inventors: Tomio Yoneyama, Yokohama (JP); Ryuichi Hasegawa, Yokohama (JP); Hideo Sano, Yokohama (JP); Junichi Oizumi, Yokohama (JP); Masaaki Nishimura, Yokohama (JP); Masami Kadowaki, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 4 days.

(21) Appl. No.: 11/403,982

(22) Filed: Apr. 14, 2006

(65) Prior Publication Data

US 2006/0182902 A1  Aug. 17, 2006

Related U.S. Application Data

(63) Continuation of application No. PCT/JP2004/015450, filed on Oct. 13, 2004.

(30) Foreign Application Priority Data

| Oct. 14, 2003 | (JP) | ............................. 2003-353832 |
| Nov. 7, 2003 | (JP) | ............................. 2003-378399 |
| Aug. 11, 2004 | (JP) | ............................. 2004-234415 |

(51) Int. Cl.
B32B 5/66 (2006.01)

(52) U.S. Cl. ................. 428/411.1; 428/474.4; 428/480; 428/500

(58) Field of Classification Search ................. 428/411, 428/411.1, 474.4, 480, 500; 532/642, 645
See application file for complete search history.

(56) References Cited

U.S. PATENT DOCUMENTS

| 2,400,877 | A | | 5/1946 | Dreyer | |
| 5,135,570 | A | | 8/1992 | Eida et al. | |
| 5,178,671 | A | | 1/1993 | Yamamoto et al. | |
| 5,739,296 | A | | 4/1998 | Gvon et al. | |
| 5,751,389 | A | | 5/1998 | Andreatta et al. | |
| 5,786,459 | A | * | 7/1998 | Stohr et al. | ................. 534/797 |
| 6,013,775 | A | * | 1/2000 | Lamm et al. | ................. 534/642 |
| 6,133,973 | A | | 10/2000 | Andreatta et al. | |
| 6,174,394 | B1 | | 1/2001 | Gvon et al. | |
| 6,323,327 | B1 | * | 11/2001 | Tzikas et al. | ................. 534/637 |
| 6,404,472 | B1 | | 6/2002 | Andreatta et al. | |
| 6,551,529 | B2 | * | 4/2003 | Taguchi et al. | ............... 252/585 |
| 6,563,640 | B1 | | 5/2003 | Ignatov et al. | |
| 7,087,730 | B2 | * | 8/2006 | Tzikas et al. | ................. 534/618 |
| 2004/0232394 | A1 | | 11/2004 | Gvon et al. | |

FOREIGN PATENT DOCUMENTS

| EP | 0 382 227 | | 8/1990 |
| EP | 0 443 386 | | 8/1991 |
| JP | 62-132965 | * | 6/1987 |
| JP | 63-220203 | | 9/1988 |
| JP | 02/209974 | | 8/1990 |
| JP | 03-078703 | | 4/1991 |
| JP | 03-294366 | | 12/1991 |
| JP | 06-228476 | * | 6/1994 |
| JP | 08-092494 | | 4/1996 |
| JP | 08-92494 | * | 4/1996 |
| JP | 8-511109 | | 11/1996 |
| JP | 10-509247 | | 9/1998 |
| JP | 2002-3742 | * | 1/2002 |
| JP | 2002-180052 | | 6/2002 |
| JP | 2002-528758 | | 9/2002 |
| JP | 2002-338838 | | 11/2002 |
| JP | 2004-300339 | * | 10/2004 |
| WO | 96/07941 | | 3/1996 |
| WO | WO 02/099480 A1 | | 12/2002 |

OTHER PUBLICATIONS

Patent Abstracts of Japan, JP 03-012606, Jan. 21, 1991.
Patent Abstracts of Japan, JP 01-161202, Jun. 23, 1989.
Patent Abstracts of Japan, JP 01-252904, Oct. 9, 1989.
John F. Dreyer, "The Fixing of Molecular Orientation", Phys. and Colloid Chem.,52, 1948, pp. 808-810.
John F. Dreyer, "Light Polarization from Films of Lyotropic Nematic Liquid Crystals", Journal de Physique, 1969, pp. C4-114-C4-116.
"Application of Functional Dyes", (supervised by Masahiro Irie) CMC Publishing Co., Ltd., published on Apr. 15, 1996, pp. 96-106, (An English translation of the text p. 102, line 5 to p. 104 attached).
P. Lazarev, et al. "X-Ray Diffraction by Large Area Organic Crystal-line Nano-Films", Mol. Materials, vol. 14, 2001, pp. 303-311.

* cited by examiner

*Primary Examiner*—Leszek Kiliman
(74) *Attorney, Agent, or Firm*—Oblon, Spivak, McClelland, Maier & Neustadt, P.C.

(57) ABSTRACT

An anisotropic dye film having high dichromatic properties is provided.

An anisotropic dye film wherein the period d attributable to molecular stacking is at most 3.445 Å, and the column length L thereof is at least 105 Å. The anisotropic dye film preferably has a degree of orientation of the molecular stacking axes of at least 85% and a film thickness of at most 30 μm, and is formed by a wet film-forming method. Since it has a molecular alignment suitable to develop a dichroic ratio, it provides high dichromatic properties. A polarizing element having this anisotropic dye film is excellent in heat resistance, light fastness and polarizing performance.

26 Claims, 6 Drawing Sheets

DYES FOR ANISOTROPIC DYE FILMS, DYE COMPOSITIONS FOR ANISOTROPIC DYE FILMS, ANISOTROPIC DYE FILMS AND POLARIZING ELEMENTS

TECHNICAL FIELD

The present invention relates to anisotropic dye films having high dichromatic properties, useful for e.g. a polarizing plate to be used for a light control device, a liquid crystal device and a display device of an organic electroluminescence device (OLED), polarizing elements employing the anisotropic dye films, and dye compositions for anisotropic dye films to obtain the anisotropic dye films. Further, the present invention relates to novel azo dyes useful for anisotropic dye films.

BACKGROUND ART

For LCD (liquid crystal display), a linear polarizing plate or a circular polarizing plate is employed to control the optical rotation and birefringence in display. For OLED also, a circular polarizing plate is used to prevent reflection of external light.

Heretofore, for such a polarizing plate, an anisotropic dye film obtained in such a manner that iodine or an organic dye having dichromatic properties is dissolved or adsorbed in a polymer material such as a polyvinyl alcohol, and the obtained film is stretched into a film in one direction so that the dichroic dye is oriented, has been widely used (for example, JP-A-3-12606, JP-A-1-160202, JP-A-1-252904) However, a conventional anisotropic dye film produced in such a manner has such problems that the heat resistance or the light fastness may be insufficient depending on the dye or the polymer material used; the yield in bonding of the anisotropic dye film in production of a liquid crystal apparatus tends to be poor. Further, iodine has high sublimation properties and accordingly when it is used for a polarizing plate, the heat resistance and the light fastness are insufficient. Further, the extinction color becomes dark grayish blue, and an ideal achromatic color polarizing plate for the entire visible spectral region can not necessarily obtained.

Accordingly, a method of forming a film containing a dichroic dye on a substrate such as glass or a transparent film by means of a wet film-forming method of coating a solution containing a dichroic dye, and orientating the dichroic dye utilizing e.g. intermolecular interaction to produce an anisotropic dye film has been studied (U.S. Pat. No. 2,400,877, JP-A-8-511109, JP-A-2002-528758, JP-A-2002-180052, JP-A-2002-338838, WO02/099480, and Dreyer, J. F., Phys. And Colloid Chem., 1948, 52, 808, "The Fixing of Molecular Orientation", Dreyer, J. F., Journal de Physique, 1969, 4, 114, "Light Polarization From Films of Lyotropic Nematic Liquid Crystals", "Application of Functional Dyes", supervised by Masahiro Irie, CMC Publishing Co., Ltd., published on Apr. 15, 1996, p. 96-106).

For applications as a polarizing element, in order to obtain higher polarizing performance, an anisotropic dye film having high dichromatic properties has been required, however, such a conventional anisotropic dye film is poor in dichromatic properties, and accordingly no polarizing element excellent in polarizing performance can be obtained.

Heretofore, various dyes have been used for an anisotropic dye film, and selection of the dye is one of important factors. For example, JP-A-3-12606 discloses use of a dichroic dye represented by the following structural formula:

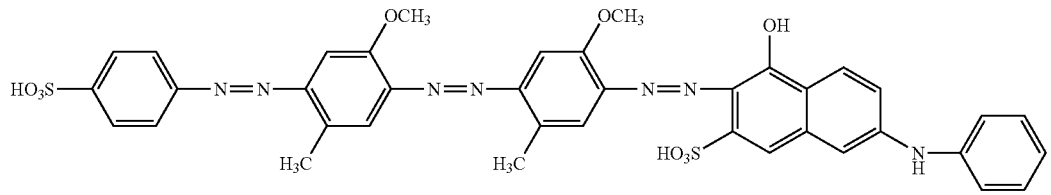

Further, JP-A-1-161202 discloses use of a dichroic dye represented by the following structural formula:

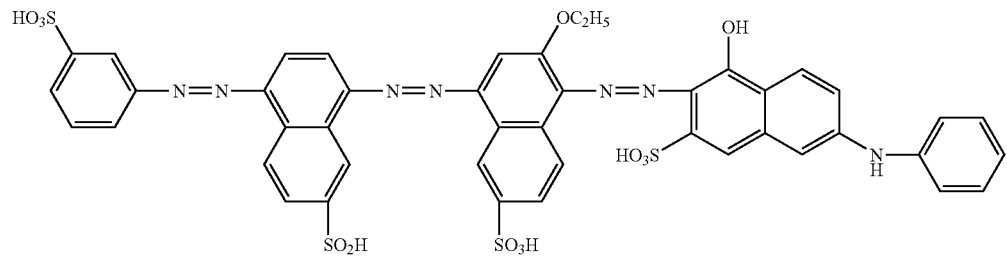

However, the compounds as disclosed in the above JP-A-3-12606 and JP-A-1-161202 have insufficient dichromatic properties, and particular the compound as disclosed in JP-A-3-12606 has a low solubility in various solvents. Accordingly, it can not be said that they are sufficient as a material of an anisotropic dye film to be produced by a wet film-forming method.

Further, JP-A-2002-528758 also discloses use of dichroic dyes represented by the following structural formulae:

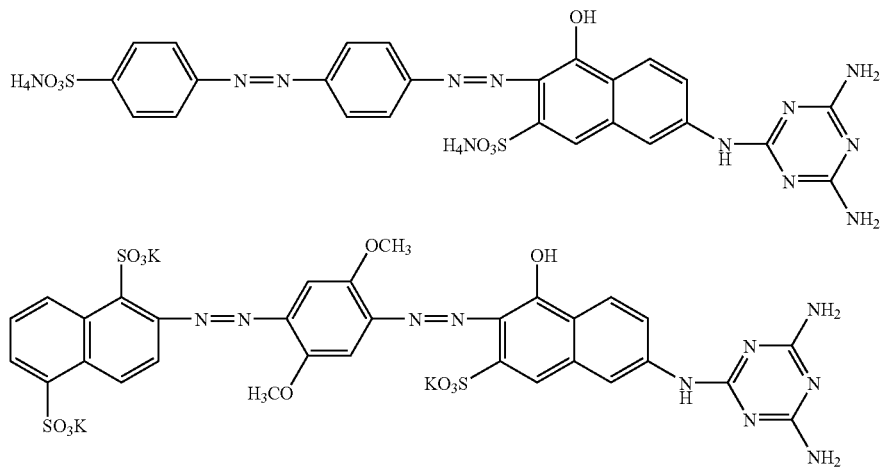

However, the above compounds are both disazo compounds, and their dichromatic properties and solubility in a solvent are insufficient as a material of an anisotropic dye film to be produced by a wet film-forming method.

WO02/099480 discloses preparation of an anisotropic dye film to be produced by a wet film-forming method, and discloses, as one example of dichroic dyes to be used, one represented by the following structural formula:

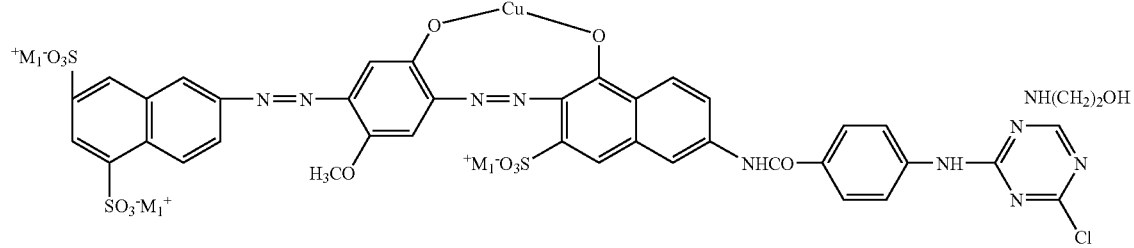

However, the above compound is a disazo compound and has a halogen atom bonded on the triazine ring, whereby it is likely to decompose.

DISCLOSURE OF THE INVENTION

It is an object of the present invention to provide anisotropic dye films having high dichromatic properties, and polarizing elements excellent in heat resistance, light fastness and polarizing performance, employing the anisotropic dye films. Further, it is an object of the present invention to provide novel dichroic dyes and dye compositions for anisotropic dye films, with which anisotropic dye films which function as anisotropic dye films having heat resistance and light fastness, can be realized.

As a result of extensive studies, the present inventors have found that an anisotropic dye film having high dichromatic properties can be securely realized by specifying crystal structure parameters of the anisotropic dye film and accomplished the present invention.

Namely, the anisotropic dye film of the present invention is characterized in that the period attributable to molecular stacking is at most 3.445 Å, and the column length thereof is at least 105 Å.

Further, the present inventors have found that as a novel dichroic azo dye, a dichroic azo dye having a specific structure, having a triazinyl group and having at least three azo couplings in one molecule, represented by the following formula (1), has high affinity with a substrate. Further, they have found that by forming a film by using a composition containing such a dye by means of a wet film-forming method, the dichroic dye molecules show a high-level molecular orientation state, that is, a dye film having high anisotropy can be formed.

Namely, the azo dye of the present invention is characterized by containing an azo dye, of which the free acid form is represented by the following formula (1):

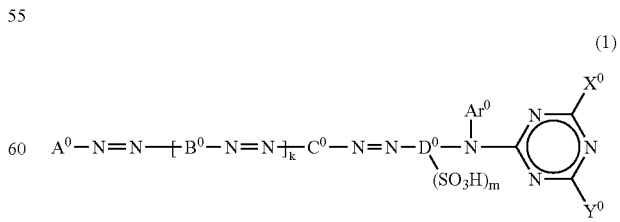

wherein each of $A^0$, $B^0$, $C^0$ and $D^0$ which are independent of one another, represents an aromatic hydrocarbon ring which may have a substituent, Ar⁰ represents a hydrogen atom or an optional substituent, each of X⁰ and Y⁰ which are independent of each other, represents an optional substituent other than a halogen atom, k represents 1 or 2, and m represents 1 or 2, provided that when k is 2, the plurality of B⁰ contained in one molecule may be the same or different.

The present inventors have further found that by employing an azo dye represented by the following formula (2), an anisotropic dye film formed by a wet film-forming method is achromatic, has high dichromatic properties and shows a high degree of molecular orientation.

Namely, the azo dye of the present invention is an azo dye for an anisotropic dye film to be formed by a wet film-forming method, of which the free acid from is represented by the following formula (2):

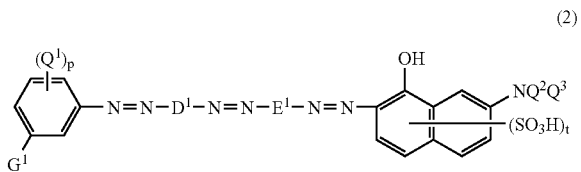

(2)

wherein each of $D^1$ and $E^1$ represents a phenylene group which may have a substituent, or a naphthylene group which may have a substituent, $G^1$ represents a carboxyl group, a sulfo group or a phosphoric group, $Q^1$ represents a halogen atom, a hydroxyl group, a nitro group, an amino group which may have a substituent, a $C_{1-4}$ alkyl group which may have a substituent, a $C_{1-3}$ alkoxy group which may have a substituent, a carboxyl group or a sulfo group, each of $Q^2$ and $Q^3$ which are independent of each other, represents a hydrogen atom, a $C_{1-4}$ alkyl group which may have a substituent, or a phenyl group which may have a substituent, p represents 0 or 1, and t represents 1 or 2.

The dye composition for an anisotropic dye film of the present invention is characterized by containing the above azo dye of the present invention.

The anisotropic dye film of the present invention is further characterized by containing the above azo dye of the present invention.

The anisotropic dye film of the present invention is further characterized by being formed by employing the above dye composition for an anisotropic dye film of the present invention.

The polarizing element of the present invention is characterized by employing the above anisotropic dye film of the present invention.

BEST MODE FOR CARRYING OUT THE INVENTION

Figure 1:
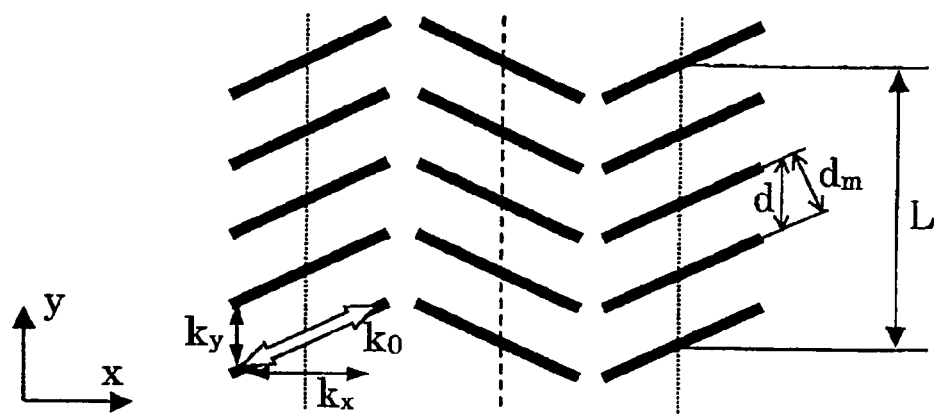
FIG. 1 is a schematic view illustrating an anisotropic dye film having such a molecular alignment that the dye molecular planes are out of the vertical to the molecular stacking axis.

Now, the embodiment of the present invention will be explained in detail below.

The following explanation regarding constituting elements is one example (representative example) of the embodiments of the present invention, and the present invention is not limited thereto within a range not to exceed the gist.

The anisotropic dye film of the present invention is a dye film which is anisotropic in electromagnetic properties in optional two directions selected from three directions in total in a three-dimensional coordinate system of the thickness direction of the dye film and optional two directions at right angles in a plane. The electromagnetic properties may, for example, be optical properties such as absorption and refraction and electrical properties such as resistance and capacity. A film which is optically anisotropic in e.g. absorption and refraction, may, for example, be a linear polarizing film, a circular polarizing film, a retardation film or a resistivity anisotropic film. Namely, the anisotropic dye film of the present invention may be used for a polarizing film, a retardation film or a resistivity anisotropic film. Particularly, since the anisotropic dye film of the present invention has absorption in a visible light region, it is useful for a polarizing film.

In the anisotropic dye film of the present invention, the period attributable to molecular stacking (hereinafter sometimes referred to as the molecular stacking period) is at most 3.445 Å, and the column length is at least 105 Å.

The reason why the anisotropic dye film of the present invention wherein the molecular stacking period is at most 3.445 Å and the molecular column length is at least 105 Å has high dichromatic properties is estimated to be as follows.

It is known that dye molecules usually have a planar molecular structure formed by an aromatic ring, and form crystals having a stacking structure in which molecular planes are overlaid one on another, due to a strong intermolecular interaction such as π-π interaction. In a case of an anisotropic dye film, in X-ray diffraction measurement, a diffraction peak attributable to the stacking period of the dye molecule stacking structure, in addition to other diffraction peaks, is observed, as disclosed in the following documents 1 and 2.

Document 1: M. Ofuji et al., Jpn. J. Appl. Phys. 2002, 41, 5467 "Grazing Incidence In-Plane X-Ray Diffraction Study on Oriented Copper Phthalocyanine Thin Films"

Document 2: M. Ofuji et. al., Jpn. J. Appln. Phys. 2003, 42, 7520 "Growth Process of Vacuum Deposited Copper Phthalocyanine Thin Films on Rubbing-Treated Substrates"

The molecular stacking period obtained by the X-ray diffraction peak analysis shows a value which reflects the stacking and the alignment state of the dye molecules in the crystals. Particularly, it is estimated that the tilt of the dye molecular plane relative to the stacking axis is important for the molecular stacking period.

Now, the molecular stacking period and the column length of the anisotropic dye film and the dichromatic properties of the anisotropic dye film will be explained with reference to FIGS. 1 to 3.

Figure 2:
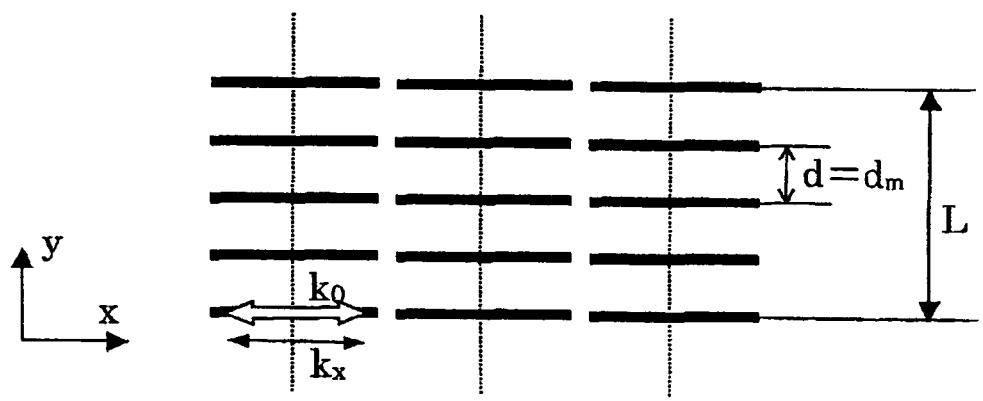
FIG. 2 is a schematic view illustrating an anisotropic dye film having such a molecular alignment that the dye molecular planes are vertical to the molecular stacking axis.
Figure 3:
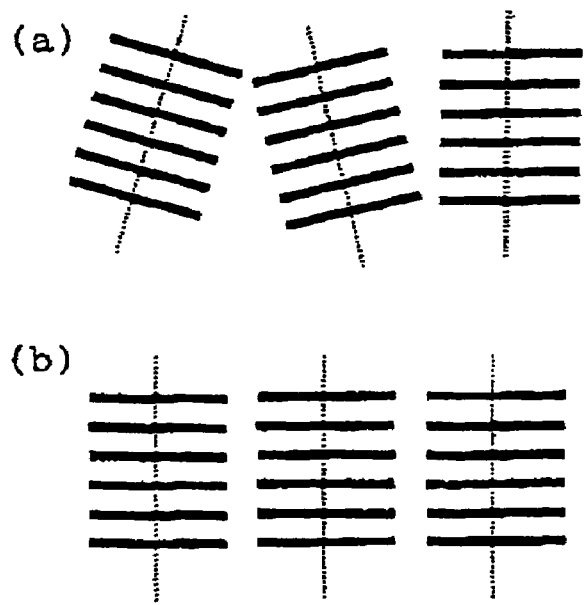
FIG. 3(a) is a schematic view illustrating an anisotropic dye film in such a state that the degree of orientation of the molecular stacking axes is low.
FIG. 3(b) is a schematic view illustrating an anisotropic dye film in such a state that the degree of orientation of the molecular stacking axes is high.

FIG. 1, FIG. 2 and FIGS. 3(*a*) and 3(*b*) are schematic views illustrating the alignment of dichroic dye molecules of an anisotropic dye film as viewed from above the anisotropic dye film. In FIGS. 1 to 3, broken lines represent molecular stacking axes, and black heavy lines represent dye molecules in a planar molecular structure. In FIGS. 1 and 2, d represents the molecular stacking period, dm represents the minimum distance between the laminated molecules, and L represents the column length. Further, when the absorption direction and the polarization direction in a plane of the anisotropic dye film are taken as an x-axis and a y-axis, respectively, $k_0$ is an extinction coefficient of the dye projected on the xy plane, and $k_x$ and $k_y$ are x-axis and y-axis direction components of the extinction coefficient.

FIG. 1 illustrates an anisotropic dye film in which molecules are aligned in such a state that the dye molecular planes are out of the vertical to the molecular stacking axis, and FIG. 2 illustrates an anisotropic dye film in which molecules are aligned in such a state that the molecular planes are vertical to the molecular stacking axis. Here, the possible minimum distance dm which the molecular planes may have, is estimated to be substantially constant due to the intermolecular interaction such as π-π interaction. When the molecular planes are significantly out of the vertical to the molecular stacking axis as shown in FIG. 1, the molecular stacking period d is d>dm and becomes a higher value accordingly. Further, when the molecular planes are vertical to the molecular stacking axis as shown in FIG. 2, d=dm and it is expected that the value of the molecular stacking period d is small.

On the other hand, the dichroic ratio of the anisotropic dye film is determined by the ratio of the extinction coefficients in the absorption direction and in the polarization direction. Accordingly, when the absorption direction and the polarization direction in a plane of the anisotropic dye film are taken as an x-axis and a y-axis, respectively, preferred is a molecular alignment in which many molecules are aligned so that the x-axis component $k_x$ of the extinction coefficient which the dichroic dye to be used has, is as large as possible, for the purpose of increasing the dichroic ratio.

In general, the absorption axis of a dichroic dye substantially agrees with the molecular long axis direction ("Application of Functional Dyes", supervised by Masahiro Irie, CMC publishing Co., Ltd., published on Apr. 15, 1996, p. 96), and accordingly it is present in the molecular plane. When the extinction coefficient of the dichroic dye projected on the xy plane is taken as $k_0$, in a case where the molecular planes are vertical to the molecular stacking axis (FIG. 2), $k_x=k_0$, and $k_x$ is higher than $k_x(<k_0)$ when the molecular planes are on the tilt (FIG. 1). Accordingly, an anisotropic dye film in which the tilt of the molecular planes relative to the stacking axis is closer to upright, i.e. the molecular stacking period d is smaller, is preferred with a view to increasing the dichromatic properties, since the value of the extinction coefficient $k_x$ is higher.

Further, from the X-ray diffraction peak analysis, the column length (L in FIGS. 1 and 2) which is the stacking distance between periodically aligned molecules can be estimated simultaneously. The number of the dye molecules included in the column length and aligned in the same direction is L/d. As described above, in order to obtain a high dichroic ratio, it is necessary that a large number of molecules are aligned in an optimum alignment, and accordingly an anisotropic dye film having a large number of laminated molecules L/d, i.e. having a longer column length L is considered to be preferred.

From the above consideration, the present inventors have found that an anisotropic dye film having a molecular alignment to develop a high dichroic ratio can be obtained by employing a portion having, as parameters, a molecular stacking period of at most 3.445 Å, and having a column length thereof of at least 105 Å.

On the other hand, as a conventional anisotropic dye film, usually one out of the above parameters has been used. Namely, it is estimated that in a conventional anisotropic dye film, not many dichroic dye molecules are aligned in a direction most suitable for development of a dichroic ratio, and accordingly no high dichroic ratio can be obtained.

For the anisotropic dye film of the present invention as specified by the above parameters, the degree of orientation of the molecular stacking axes as shown in FIG. 3 is also important for development of high dichromatic properties. Namely, in order to align a larger number of molecules in the same direction, it is desirable that the degree of orientation of the molecular stacking axes is also high. Accordingly, the anisotropic dye film of the present invention preferably has a degree of orientation of at least 85% as estimated by X-ray diffraction measurement as described hereinafter.

The molecular stacking period of the anisotropic dye film of the present invention is preferably at least 3.300 Å, more preferably at least 3.380, most preferably at least 3.400 Å, and at most 3.445 Å, preferably at most 3.440 Å, more preferably at most 3.435 Å. If the molecular stacking period of the anisotropic dye film exceeds this upper limit, the tilt of the molecules in the molecular stacking tends to be significant, and the dichroic ratio may decrease. Further, if it is lower than the lower limit, the molecules may be too close to one another, and the molecular stacking may be impaired.

Further, the molecular column length of the anisotropic dye film of the present invention is at least 105 Å, preferably at least 115 Å, more preferably at least 140 Å, and preferably at most 1 µm, more preferably at most 500 nm, most preferably at most 100 nm. If the molecular column length of the anisotropic dye film exceeds this upper limit, the crystal structure is likely to be distorted, and the degree of orientation of the molecular stacking axes may decrease. Further, if it is lower than the lower limit, the number of molecules which are aligned in the same direction is small, and thus no high dichroic ratio may be obtained.

The above parameters of the anisotropic dye film, i.e. the values of the molecular stacking period and the column length thereof are obtained by an X-ray diffraction profile as measured by an X-ray diffraction apparatus for thin film evaluation ("RINT2000PC" in-plane diffraction system, manufactured by Rigaku Corporation) or a similar apparatus (e.g. the above documents 1, 2).

Of the anisotropic dye film of the present invention, the above parameters are obtained in accordance with the following procedures (1) to (3) for example.

(1) First, with respect to the anisotropic dye film, in-plane measurement is carried out from two directions, in which the diffracting plane vertical to the absorption axis and the diffraction plane vertical to the polarization axis are observed. With respect to the anisotropic dye film of the present invention, a highly intense diffraction peak attributable to the molecular stacking period is measured within an angle of diffraction ($2\theta_x$) against CuKα of from about 24.7° to about 27° usually only in measurement from one direction between the in-plane measurements from two directions.

(2) The X-ray diffraction profile from the direction in which a peak attributable to the molecular stacking is observed, is subjected to optimization in accordance with the following mathematical formula $f(2\theta_x)$ within a range of $2\theta_x$ of from 20° to 30°:

$$f(2\theta_x) = B(2\theta_x) + C_1\exp[-((2\theta_x - 2\theta_1)/2\sigma_1)^2] + C_2\exp[-((2\theta_x - 2\theta_2)/2\sigma_2)^2]$$

Namely, assuming that a crystalline portion in which the molecules are periodically laminated and a non-crystalline portion in which the molecules are randomly laminated coexist in the anisotropic dye film of the present invention, the above formula described by two Gaussian functions is employed.

Here, $C_1$ and $C_2$ represent the coefficients, $2\theta_1$ and $2\theta_2$ represent the peak positions, and $\sigma_1$ and $\sigma_2$ represent the standard deviations.

Further, $B(2\theta_x)$ represents a base line, and in this case, the X-ray diffraction profile from the direction in which a diffraction peak attributable to the molecular stacking is not observed, is taken as the base line. However, in a case where there is a diffraction peak from another diffracting plane, the peak is removed and interpolation is carried out to obtain a base line.

(3) Since the parameters obtained in the present invention are structural parameters at the crystalline portion in which molecules are periodically laminated, the peak position of the diffraction peak is $2\theta_1$ and the half value width of the peak is $\beta_1 = 2\sigma_1\sqrt{(2\ln 2)}$ when $\sigma_1 < \sigma_2$. From the peak position $2\theta_1$, the molecular stacking period d can be estimated from the following Bragg condition:

$$d = \lambda/(2\sin\theta_1)$$

wherein λ is the X-ray wavelength (=1.54 Å).

Further, the column length L can be estimated from the half value width $\beta$ (=$\beta_1 \times \pi/180$ rad) in accordance with the following Scherrer formula:

$$L = K\lambda/(\beta\cos\theta_1)$$

wherein K is the Scherrer constant, and a value of K=1 is employed here.

The degree of orientation of the molecular stacking axes of the anisotropic dye film can also be obtained from the measurement by the above apparatus as follows for example (e.g. the above documents 1, 2). Namely, when in-plane rocking scan measurement is carried out over 360° with respect to the above diffraction peak as observed by the in-plane measurement, usually two peaks corresponding to the degree of orientation of the molecular stacking axes are usually observed in the case of the anisotropic dye film of the present invention. The rocking profile is subjected to the optimization in accordance with the following mathematical formula $g(\Phi)$:

$$g(\Phi) = C_0 + C_1\exp[-((\Phi - \Phi_1)/2\sigma_1)^2] + C_2\exp[-((\Phi - \Phi_2)/2\sigma_2)^2]$$

Here $C_0$, $C_1$ and $C_2$ represent the coefficients, $\Phi$ represents the angle of rotation, $\Phi_1$ and $\Phi_2$ represent the peak positions, and $\sigma_1$ and $\sigma_2$ represent the standard deviations.

The degree of orientation P (unit: %) of the molecular stacking axes of the present invention is defined in accordance with the following formula:

$$P = (360 - 2\sigma_1 - 2\sigma_2)/360 \times 100$$

The anisotropic dye film of the present invention is one having a degree of orientation of the molecular stacking axes as defined above of preferably at least 85%. The degree of orientation is more preferably at least 88%, most preferably at least 90%, particularly preferably at least 94%. If the degree of orientation is lower than the above lower limit, the number of molecules which are aligned in the same direction is small, and thus no high dichroic ratio may be obtained.

The anisotropic dye film of the present invention which satisfies the above parameters has a high dichroic ratio, and the dichroic ratio is preferably at least 11, more preferably at least 13, most preferably at least 15.

The film thickness of the anisotropic dye film of the present invention, usually as the film thickness after drying, is preferably at least 10 nm, more preferably at least 50 nm, and preferably at most 30 μm, more preferably at most 1 μm. If the film thickness of the anisotropic dye film exceeds 30 μm, it may be difficult to obtain uniform orientation of the dye molecules in the film, and if it is thinner than 10 nm, it may be difficult to obtain a uniform film thickness.

The anisotropic dye film having a period attributable to the molecular stacking of at most 3.445 Å and a column length thereof of at least 105 Å can be obtained by selecting the combination of a dye and additives contained in the anisotropic dye film. Needless to say, the process for producing the anisotropic dye film is also one of important factors to obtain such an anisotropic dye film, and to obtain such an anisotropic dye film, it is preferred to employ a wet film-forming method.

The dye to be used for the anisotropic dye film of the present invention may, for example, be an azo type dye, a stilbene type dye, a cyanine type dye, a phthalocyanine type dye or a condensed polycyclic type dye (perylene type or oxazine type). Among these dyes, particularly preferred as the dye most suitable to obtain the anisotropic dye film of the present invention is an azo type dye, the molecules of which may have a high degree of alignment in the anisotropic dye film. Particularly preferred are dyes as represented by the formulae (1) and (2) as described hereinafter.

The azo type dye is a dye having at least one azo group. The number of the azo group in one molecule is preferably at least 1, more preferably at least 2, and preferably at most 6, more preferably at most 4, in view of the chromaticness and production.

Such a dye is preferably water soluble so as to be subjected to a wet film-forming method as described hereinafter. Accordingly, preferred is a dye having, as a substituent which provides water solubility, an acidic group such as a sulfo group, a carboxyl group or a phosphoric group, a basic group such as an amino acid group or a soluble group such as a hydroxyl group, and it particularly preferably has a sulfo group or a carboxyl group in view of high water solubility.

The molecular weight of such a dye is preferably usually at least 200, particularly at least 350, and usually at most 5,000, particularly at most 3,500, in a free state, not in the salt form, in view of the color tone and production.

As specific examples of such a dye, dyes as disclosed in the above-described U.S. Pat. No. 2,400,877, Dreyer, J. F., Phys. And Colloid Chem. 1948, 52, 808, "The Fixing of Molecular Orientation", Dreyer, J. F., Journal de Physique, 1969, 4, 114, "Light Polarization From Films of Lyotropic Nematic Liquid Crystals", and J. Lyndon, "Chromonics" in "Handbook of Liquid Crystals Vol. 2B: Low Molecular Weight Liquid Crystals II", D. Demus, J. Goodby, G. W. Gray, H. W. Spiessm, V. Villed, Willey-VCH, P. 981-1007, (1998) may be mentioned.

Further, particularly, the anisotropic dye film of the present invention preferably contains a novel azo dye, of which the free acid form is represented by the following formula (1):

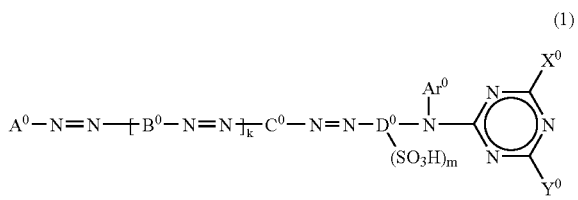

wherein each of $A^0$, $B^0$, $C^0$ and $D^0$ which are independent of one another, represents an aromatic hydrocarbon ring which may have a substituent, $Ar^0$ represents a hydrogen atom or an optional substituent, each of $X^0$ and $Y^0$ which are independent of each other, represents an optional substituent other than a halogen atom, k represents 1 or 2, and m represents 1 or 2, provided that when k is 2, the plurality of $B^0$ contained in one molecule may be the same or different.

This azo dye is a dye which has dichroic properties, which is excellent in chromaticness and solubility in a solvent, and which has a high stability in a solution. Accordingly, it can be used for various applications, however, a particularly high effect can be obtained when used for an anisotropic dye film. Namely, the anisotropic dye film of the present invention employing this dye has high dichromatic properties and at the same time, has high heat resistance and light fastness as compared with a conventional iodine type polarizing film.

Particularly, as described above, since the dye has a high solubility in a solvent and a high stability in a solution, a dye composition for an anisotropic dye film containing this dye has a high storage stability. Accordingly, the azo dye of the present invention is applied preferably to formation of an anisotropic dye film by a wet film-forming method as described hereinafter. By the wet film-forming method, it is possible to form an anisotropic dye film on a high heat resistant substrate such as glass, whereby a high heat resistant polarizing element can be obtained, which can be used for applications for which high heat resistance is required, such as a liquid crystal projector and an on-vehicle display panel.

In the above formula (1), the aromatic hydrocarbon rings as $A^0$ to $D^0$ may be aromatic hydrocarbon rings having a carbon number of from about 6 to about 20, and preferably they are independently benzene rings or naphthalene rings. Among them, $D^0$ is more preferably a 1,4-phenylene group when $D^0$ is a benzene ring, and it is preferably a 2,6-naphthylene group when it is a naphthalene ring. Further, it is preferably a bivalent group derived from 1-naphthol ring or 2-naphthol ring, particularly preferably a group derived from 1-naphthol ring since a dye having a dark grayish color can be obtained.

The substituent which the aromatic hydrocarbon rings of $A^0$ to $D^0$ may have, may, for example, be a group properly selected from electron acceptable groups and electron donative groups to be introduced to control the color tone, or a hydrophilic group to be introduced to increase the solubility in a solvent. Specifically, groups as mentioned as the substituent which $A^1$ to $C^1$ in the formula (1-a) as mentioned hereinafter may have, may, for example, be mentioned.

The optional substituent as $Ar^0$ may, for example, be a group properly selected from electron acceptable groups and electron donative groups to be introduced to control the color tone or a hydrophilic group to be introduced to increase the solubility in a solvent. Specifically, groups as exemplified as $Ar^1$ in the formula (1-a) as mentioned hereinafter may, for example, be mentioned.

The optional substituent other than a halogen atom as each of $X^0$ and $Y^0$, may, for example, be a hydrophilic group or a hydrophobic group to be introduced to control the solubility in a solvent. Specifically, groups as exemplified as each of $X^1$ and $Y^1$ in the formula (1-a) as mentioned hereinafter may, for example, be mentioned.

The azo dye of the present invention represented by the above formula (1) is preferably one of which the free acid form is represented by the following formula (1-a):

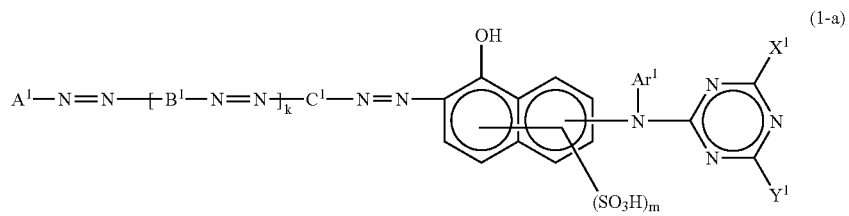

wherein $A^1$ represents a phenyl group which may have a substituent, or a naphthyl group which may have a substituent, each of $B^1$ and $C^1$ which are independent of each other, represents a phenylene group which may have a substituent, or a naphthylene group which may have a substituent, $Ar^1$ represents a hydrogen atom or a $C_{1-5}$ alkyl group which may have a substituent, each of $X^1$ and $Y^1$ which are independent of each other, represents a $-NR^1R^2$ group, a $-OR^3$ group or a $-SR^4$ group, provided that each of $R^1$, $R^2$, $R^3$ and $R^4$ which are independent of one another, represents a hydrogen atom, a $C_{1-18}$ alkyl group which may have a substituent, a $C_{2-18}$ alkenyl group which may have a substituent, a $C_{3-15}$ hydrocarbon ring group which may have a substituent, or a heterocyclic group consisting of a 5- or 6-membered monocyclic ring or a condensed ring of two or three such monocyclic rings, which may have a substituent, or $R^1$ and $R^2$ may be mutually bonded to form a 5- or 6-membered ring containing a nitrogen atom, and the ring formed by bonding of $R^1$ and $R^2$, may have a substituent, k represents 1 or 2, and m represents 1 or 2, provided that when k is 2, the plurality of $B^1$ contained in one molecule, may be the same or different.

In the above formula (1-a), $A^1$ represents a phenyl group which may have a substituent, or a naphthyl group which may be have a substituent.

In a case where $A^1$ is a phenyl group, the substituent of the phenyl group may, for example, be a sulfo group, a carboxyl group, a hydroxyl group, a nitro group, a halogen atom, an amino group which may have a substituent, an alkyl group which may have a substituent, or an alkoxy group which may have a substituent.

As the halogen atom, the amino group, the alkyl group and the alkoxy group, specifically the following may be mentioned.

A halogen atom which is a fluorine atom, a chlorine atom, a bromine atom or a iodine atom;

an amino group;

a $C_{1-8}$ (preferably $C_{1-8}$) alkylamino group such as a N-methylamino group, a N,N-dimethylamino group or a N,N-diethylamino group;

a $C_{6-18}$ (preferably $C_{6-10}$) arylamino group such as a N-phenylamino group or a N-naphthylamino group;

a $C_{2-18}$ (preferably $C_{2-11}$) acylamino group such as an acetylamino group or a benzoylamino group;

a $C_{1-18}$ (preferably $C_{1-12}$) alkyl group such as a methyl group, an ethyl group, a n-propyl group, an i-propyl group, a n-butyl group or a n-dodecyl group;

a $C_{1-18}$ (preferably $C_{1-12}$) alkoxy group such as a methoxy group, an ethoxy group, an i-propoxy group, a n-butoxy group or a n-dodecyloxy group.

The above amino group, alkyl group and alkoxy group may have a substituent, and the substituent may, for example, be a hydroxyl group or an alkoxy group.

In a case where $A^1$ is a phenyl group which may have a substituent, the substituent which the phenyl group has is more preferably a sulfo group, a carboxyl group, a halogen atom, an amino group which may have a substituent, an alkyl group which may have a substituent, or an alkoxy group which may have a substituent, in view of the solubility in a solvent and the color tone. It is particularly preferably a sulfo group, a carboxyl group, an acylamino group or an alkyl group. In a case where $A^1$ is a phenyl group, the phenyl group preferably has from 1 to 3 substituents selected from these substituents.

In a case where $A^1$ is a naphthyl group, the preferred substituent of the naphthyl group may, for example, be a sulfo group, a carboxyl group or a hydroxyl group, and the naphthyl group preferably has from 1 to 3 substituents selected from such substituents. A sulfo group is mentioned as a particularly preferred substituent.

Each of $B^1$ and $C^1$ which are independent of each other, represents a phenylene group which may have a substituent, or a naphthylene group which may have a substituent, and the phenylene group is preferably a 1,4-phenylene group, and the naphthylene group is preferably a 1,4-naphthylene group.

In a case where each of $B^1$ and $C^1$ is a phenylene group, the substituent which the phenylene group may have is preferably a sulfo group, a carboxyl group, an alkyl group which may have a substituent, an alkoxy group which may have a substituent or an amino group which may have a substituent.

As specific examples of the alkyl group, the alkoxy group and the amino group, the following may, for example, be mentioned:

A $C_{1-4}$ alkyl group such as a methyl group, an ethyl group, a n-propyl group, an i-propyl group or a n-butyl group;

a $C_{1-4}$ alkoxy group such as a methoxy group, an ethoxy group, a hydroxyethoxy group, a n-propoxy group, an i-propoxy group or a n-butoxy group;

an amino group;

a $C_{1-8}$ alkylamino group such as a N-methylamino group, a N,N-dimethylamino group or a N,N-diethylamino group;

an arylamino group such as a N-phenylamino group;

a $C_{2-8}$ acylamino group such as an acetylamino group or a benzoylamino group.

The above alkyl group, alkoxy group and amino group may have a substituent, and the substituent may, for example, be a hydroxyl group, an alkoxy group or a halogen atom.

In a case where each of $B^1$ and $C^1$ is a phenylene group which may have a substituent, the substituent of the phenylene group is preferably a sulfo group, a carboxyl group, an alkyl group which may have a substituent, an alkoxy group which may have a substituent, or an acylamino group which may have a substituent, among the above groups. Particularly in view of hydrophobic bond properties (interaction between molecules) and the color tone, preferred is an alkyl group, an alkoxy group or an acylamino group.

In a case where each of $B^1$ and $C^1$ is a phenylene group, it preferably has from 1 to 3 substituents as represented by the above substituents, it more preferably has from 1 to 2 substituents.

In a case where each of $B^1$ and $C^1$ is a naphthylene group, the substituent of the naphthylene group may, for example, be a hydroxyl group, a sulfo group or an alkoxy group which may have a substituent.

As the alkoxy group, specifically, a $C_{1-4}$ alkoxy group such as a methoxy group or an ethoxy group may, for example, be mentioned. The substituent which the alkoxy group may have is preferably a hydroxyl group, a hydroxyalkyl group or an alkoxy group.

The naphthylene group as each of $B^1$ and $C^1$ preferably has from 1 to 6, more preferably from 1 to 3, substituents selected from such substituents. The substituent which the naphthylene group as each of $B^1$ and $C^1$ may have, is particularly preferably a sulfo group or an alkoxy group which may have a substituent.

$Ar^1$ is a hydrogen atom or a $C_{1-5}$ alkyl group which may have a substituent, and it is preferably a hydrogen atom or a $C_{1-4}$ alkyl group which may have a substituent (such as a methyl group, an ethyl group, or such a group which is further substituted). It is particularly preferably a hydrogen atom. The substituent which the alkyl group may have may, for example, be a hydroxyl group, a sulfo group or a carboxyl group.

Each of $X^1$ and $Y^1$ which are independent of each other, represents a —$NR^1R^2$ group, a —$OR^3$ group or a —$SR^4$ group, provided that each of $R^1$, $R^2$, $R^3$ and $R^4$ which are independent of one another, represents a hydrogen atom, an alkyl group which may have a substituent, an alkenyl group which may have a substituent, a hydrocarbon ring group (an aryl group or an alicyclic group) which may have a substituent, or a heterocyclic group which may have a substituent.

Specifically, it represents, for example:

a hydrogen atom;

a $C_{1-18}$ (preferably $C_{1-12}$) alkyl group such as a methyl group, an ethyl group, an i-propyl group, an n-butyl group, a n-octyl group or a n-dodecyl group;

a $C_{2-18}$ (preferably $C_{2-8}$) alkenyl group such as a vinyl group or an allyl group;

a $C_{6-18}$ (preferably $C_{6-12}$) aryl group such as a phenyl group or a naphthyl group;

a $C_{6-18}$ (preferably $C_{6-10}$) alicyclic group such as a cyclohexyl group or a cyclohexenyl group; or an aromatic or non-aromatic heterocyclic group consisting of a 5- or 6-membered monocyclic ring or a condensed ring of two or three such monocyclic rings, such as a pyridyl group, a thidiazolyl group, a benzothiazolyl group, a morpholinyl group, a piperidinyl group or a piperazinyl group.

The substituent which the above alkyl group, alkenyl group, aryl group, alicyclic group or heterocyclic group may have may, for example, be a hydroxyl group, a carboxyl group, a sulfo group or an aryl group, and it is more preferably a hydroxyl group, a carboxyl group or a sulfo group.

Each of $R^1$ and $R^2$ is more preferably a hydrogen atom, an alkyl group which may have a substituent, or an aryl group which may have a substituent, and particularly preferably an aryl group which may have a substituent.

Further, preferred is a case where one of $R^1$ and $R^2$ is a hydrogen atom and the other is other than a hydrogen atom.

Each of $R^3$ and $R^4$ is preferably a hydrogen atom or an alkyl group which may have a substituent.

With respect to $X^1$ and $Y^1$, more preferred is a case where both are —$NR^1R^2$ groups (provided that $R^1$ and $R^2$ may be the same or different) or a case where one is a —$NR^1R^2$ group and the other is a —$OR^3$ group.

$X^1$ and $X^2$ may be mutually bonded to form a nitrogen-containing ring which may have a substituent, and in a case where $R^1$ and $R^2$ are mutually bonded to form a 5- or 6-membered ring containing a nitrogen atom, the ring is preferably a morpholine ring, a piperazine ring or a piperidine ring.

k represents 1 or 2, and m represents 1 or 2. When k is 2, the plurality of $B^1$ contained in one molecule may be the same or different.

The azo dye of the present invention represented by the above formula (1) is more preferably one of which the free acid form is represented by the following formula (1-b):

wherein $A^2$ represents a phenyl group which may have a substituent or a naphthyl group which may have a substituent, each of $B^2$ and $C^2$ which are independent of each other, represents a phenylene group which may have a substituent or a naphthylene group which may have a substituent, $Ar^2$ represents a hydrogen atom or a $C_{1-4}$ alkyl group which may have a substituent, each of $X^2$ and $Y^2$ which are independent of each other, represents a —$NR^5R^6$, a —$OR^7$ group or a —$SR^8$ group, provided that each of $R^5$, $R^6$, $R^7$ and $R^8$ which are independent of one another, represents a hydrogen atom, a $C_{1-8}$ alkyl group which may have a substituent, a $C_{2-18}$ alkenyl group which may have a substituent, a $C_{3-15}$ hydrocarbon ring group which may have a substituent, or a heterocyclic group consisting of a 5- or 6-membered monocyclic ring or a condensed ring of two or three such monocyclic rings, which may have a substituent, or $R^5$ and $R^6$ may be mutually bonded to form a 5- or 6-membered ring containing a nitrogen atom, and the ring formed by bonding of $R^5$ and $R^6$ may have a substituent, k represents 1 or 2, and n represents 0 or 1, provided that when k is 2, the plurality of $B^2$ contained in one molecule may be the same or different.

Examples of preferred substituents of $A^2$, $B^2$, $C^2$, $Ar^2$, $X^2$ and $Y^2$ in the above formula (1-b) are similar to those as exemplified as the preferred substituents of $A^1$, $B^1$, $C^1$, $Ar^1$, $X^1$ and $Y^1$ in the above formula (1-a), respectively.

The azo dye of the present invention represented by the above formula (1) is a trisazo dye when k=1, or a tetrakisazo dye when k=2, in the above formulae (1), (1-a) and (1-b) for example. In view of easiness of synthesis and availability of the material in industrial production, preferred is k=1 i.e. a trisazo dye. From such a viewpoint that a stronger intermolecular interaction will be obtained when the dye is used for an anisotropic dye film as mentioned hereinafter, preferred is k=2 i.e. a tetrakisazo dye.

The azo dye represented by the above formula (1) of the present invention, regardless of the free acid from represented by the above formula (1), (1-a) or (1-b), has a molecular weight in the free acid form of usually at least 500, preferably at least 550, and usually at most 5,000, preferably at most 4,000, more preferably at most 3,500. If the molecular weight exceeds the above upper limit, the color development properties may decrease, and if it is lower than the above lower limit, the absorption spectral peak may shift toward the shorter wavelength side (the color tone may be light).

As specific examples of the azo dye represented by the above formula (1) of the present invention, dyes of which the structures of the free acid forms are represented by the following formulae (I-1) to (I-31) may, for example, be mentioned, however, the azo dye of the present invention is not limited thereto:

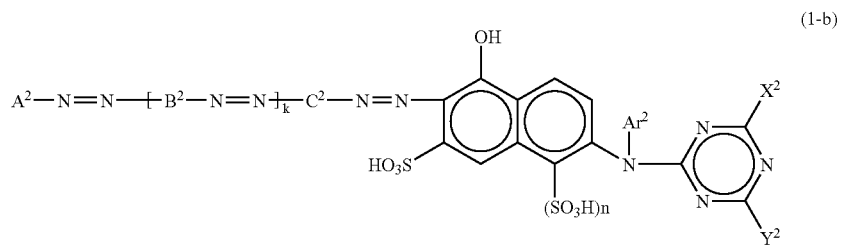

(1-b)

(I-1)
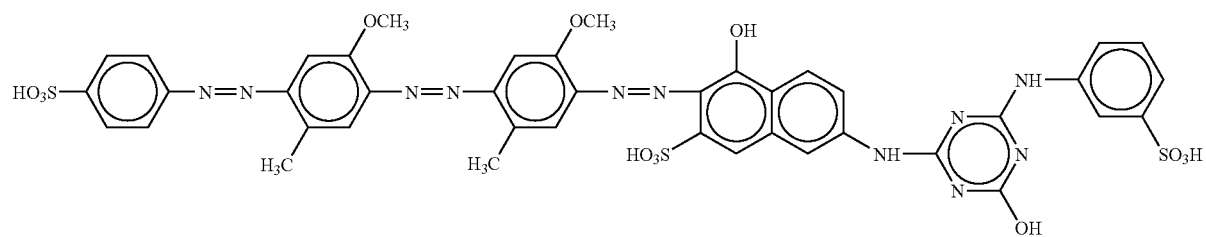
(I-2)
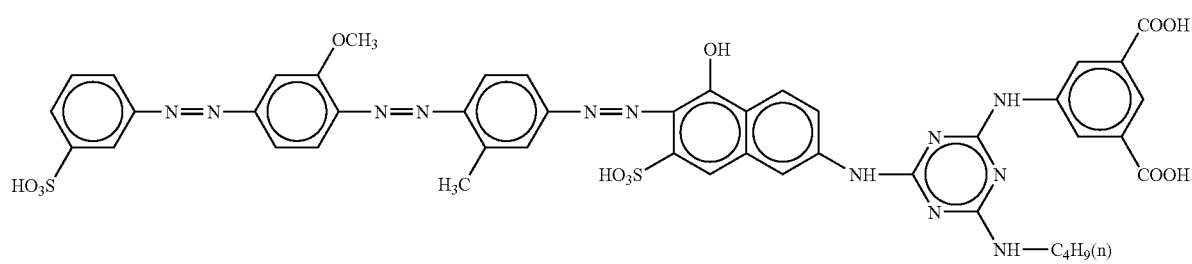
(I-3)
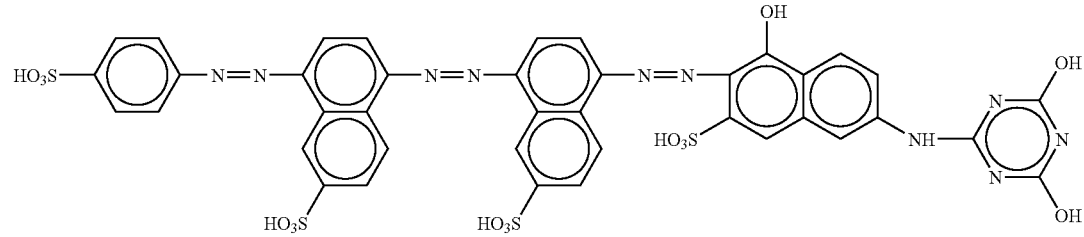
(I-4)
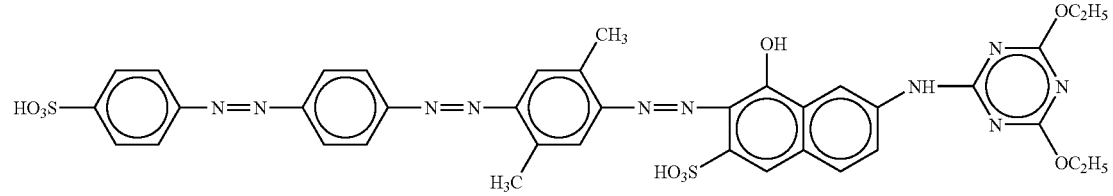
(I-5)
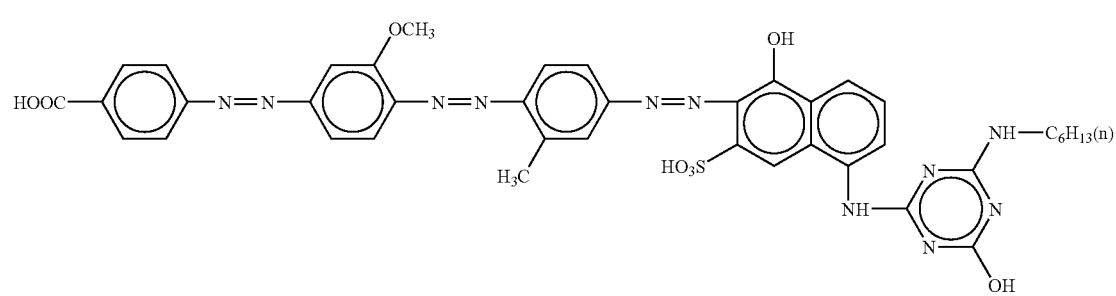
(I-6)
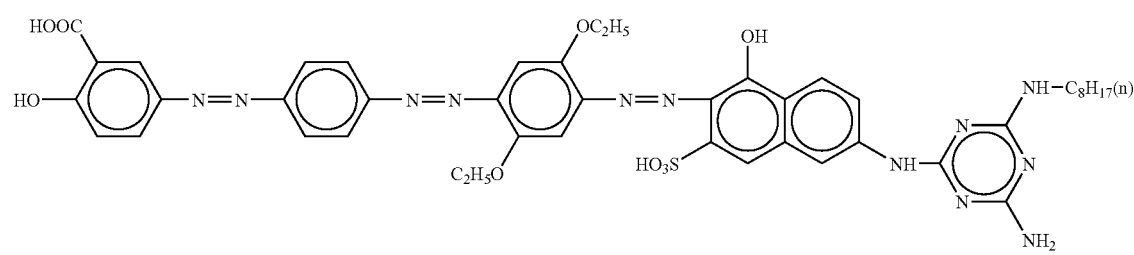

-continued
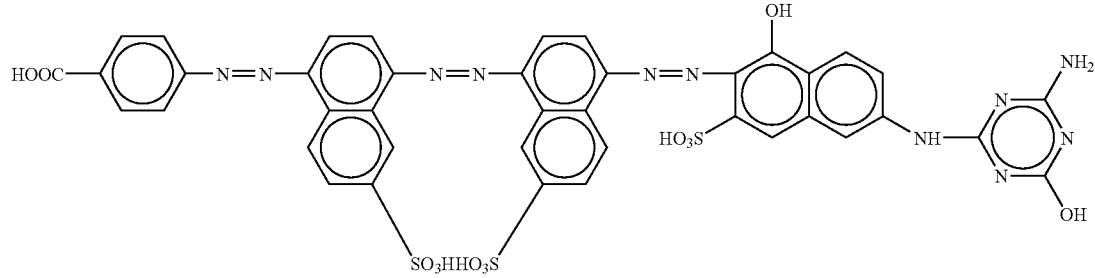
(I-7)
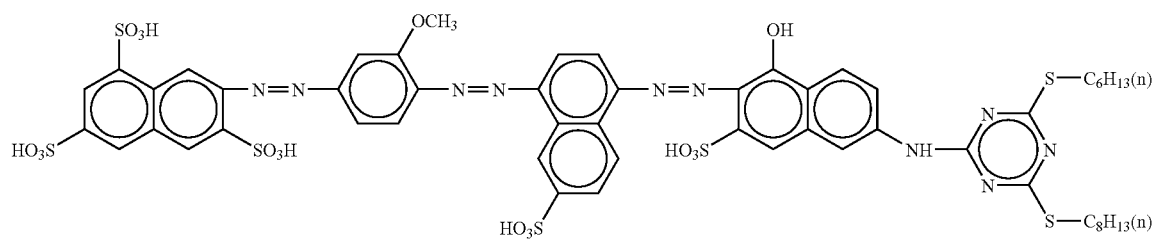
(I-8)
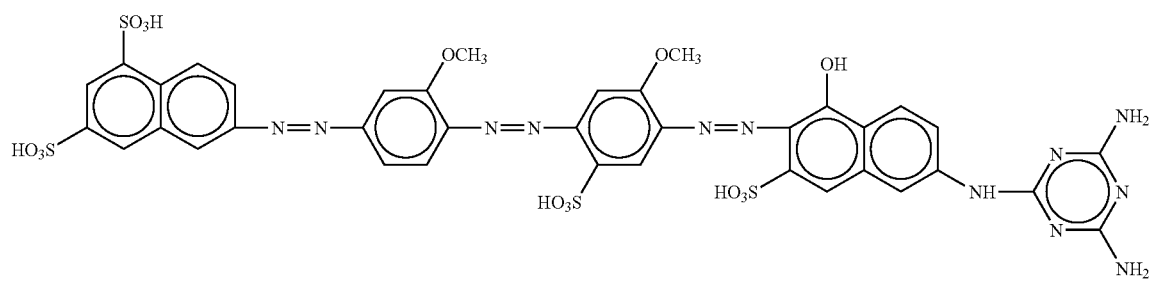
(I-9)
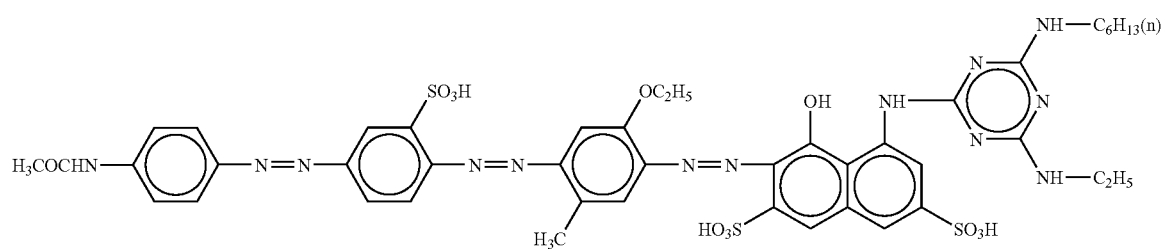
(I-10)
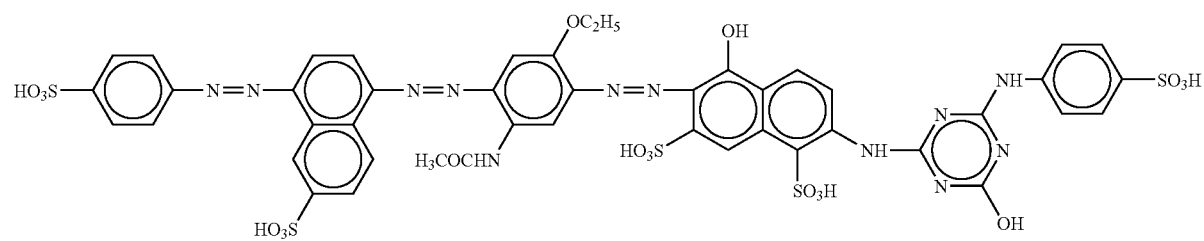
(I-11)

-continued
(I-12)
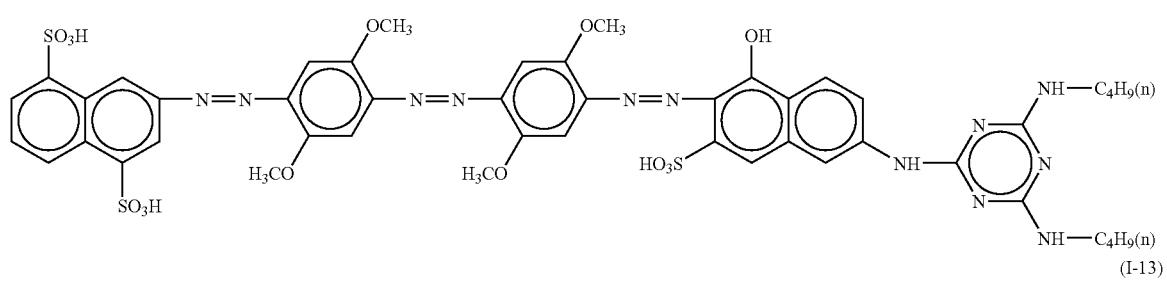
(I-13)
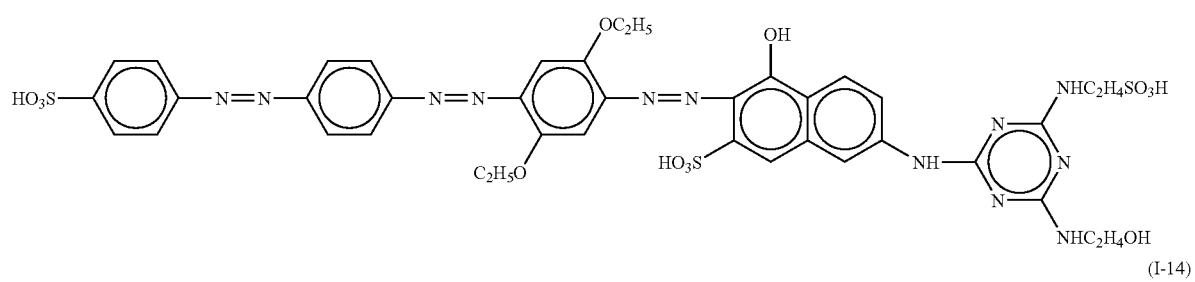
(I-14)
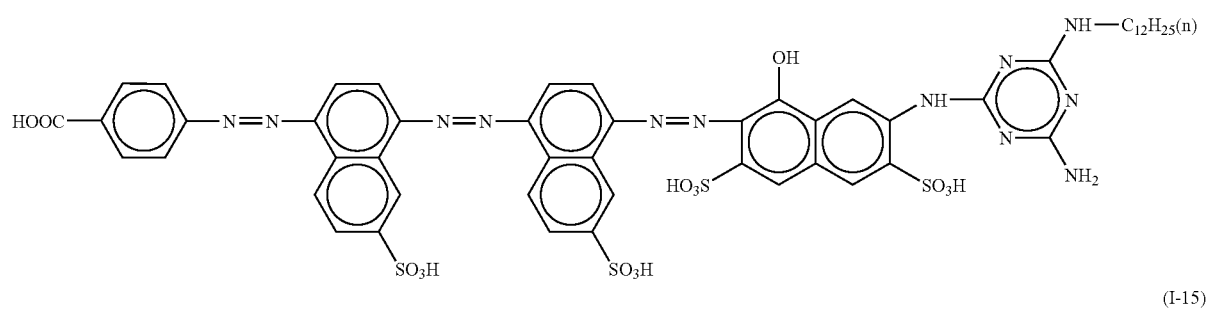
(I-15)
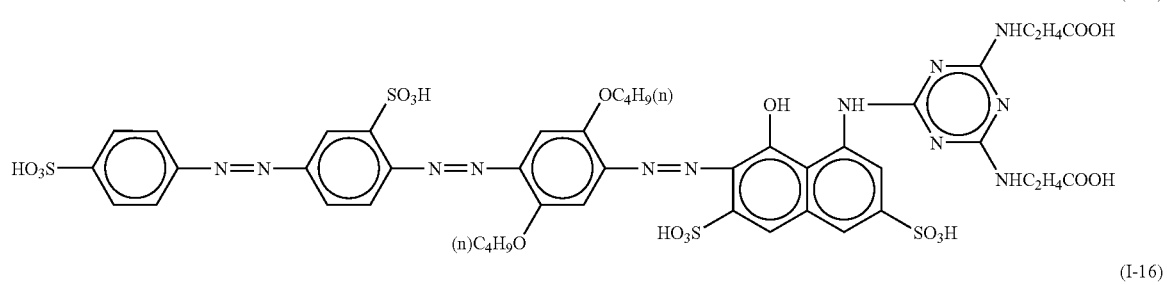
(I-16)
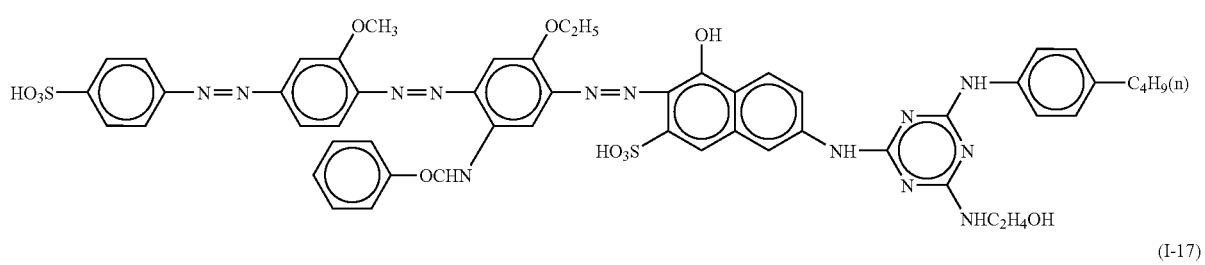
(I-17)
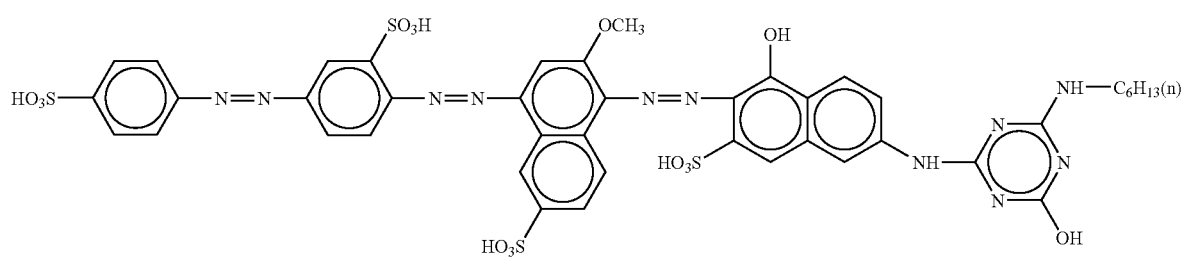

-continued
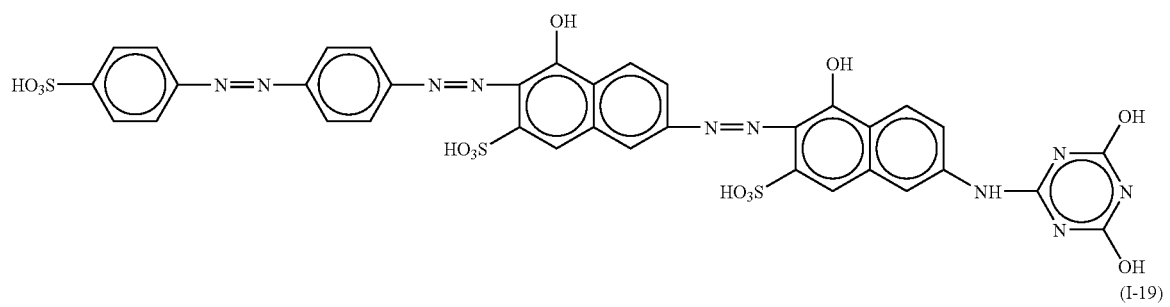
(I-18)
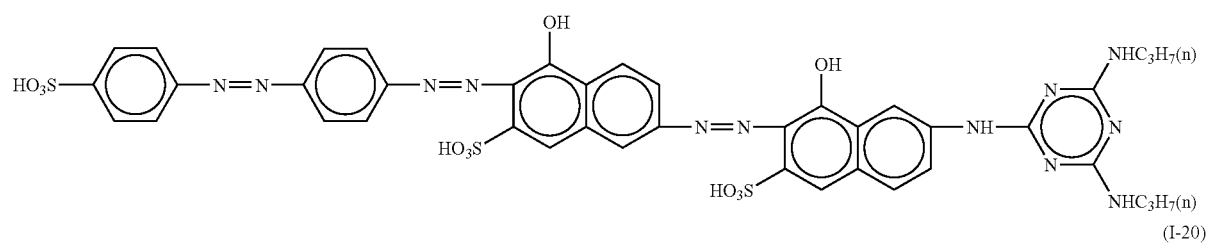
(I-19)
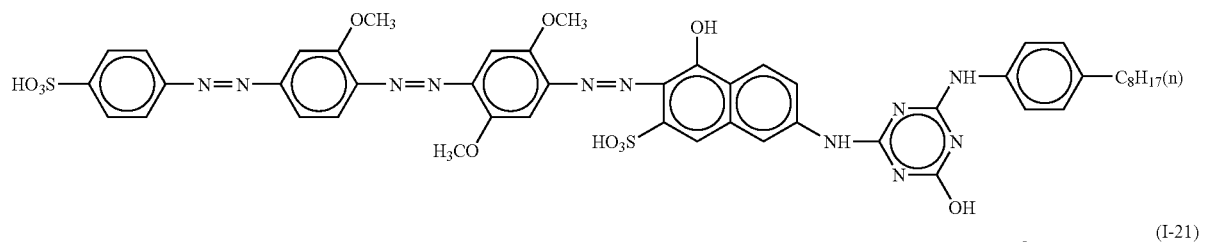
(I-20)
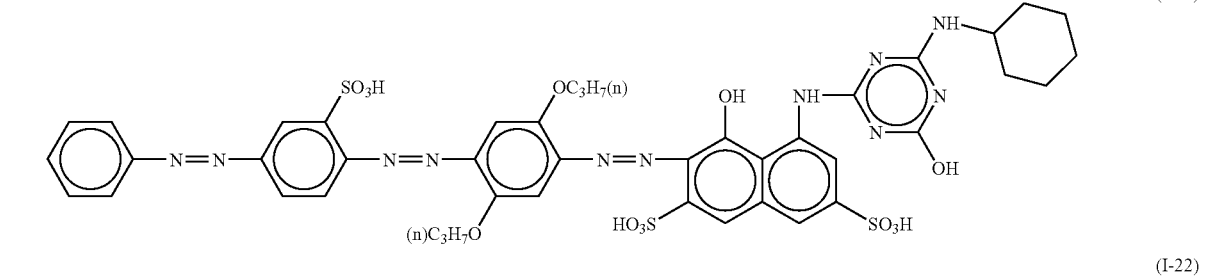
(I-21)
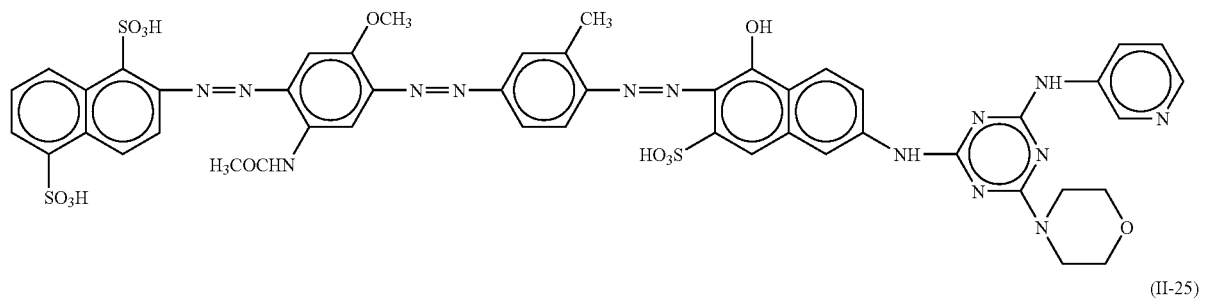
(I-22)
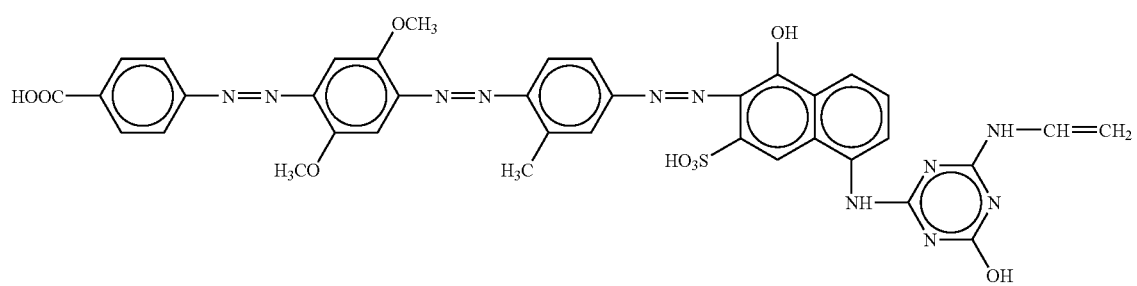
(II-25)

-continued
(I-24)
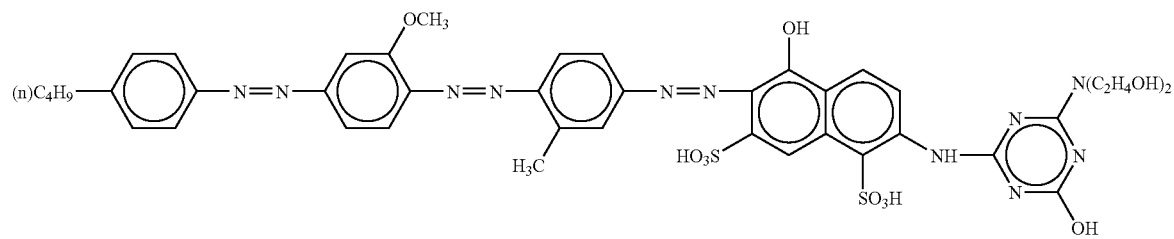
(I-25)
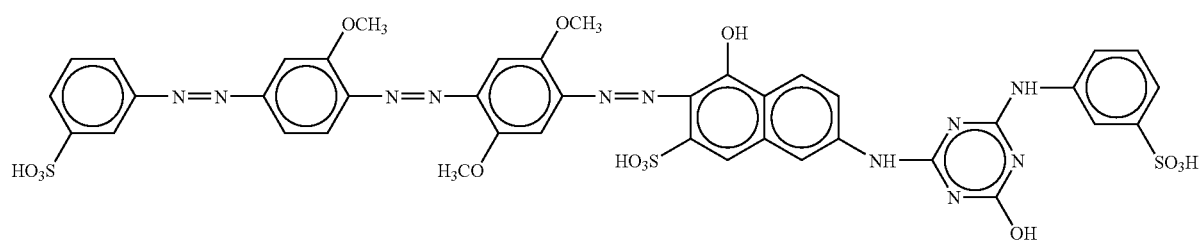
(I-26)
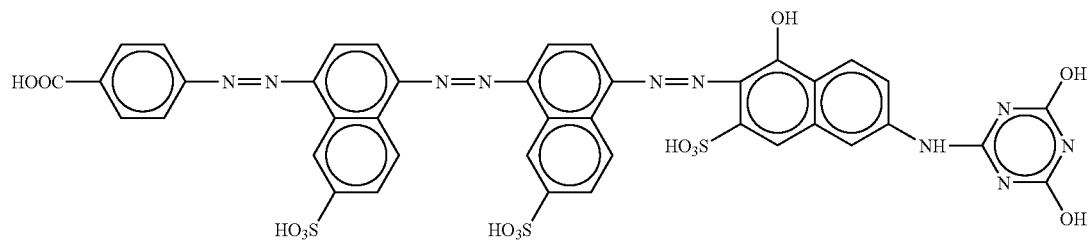
(I-27)
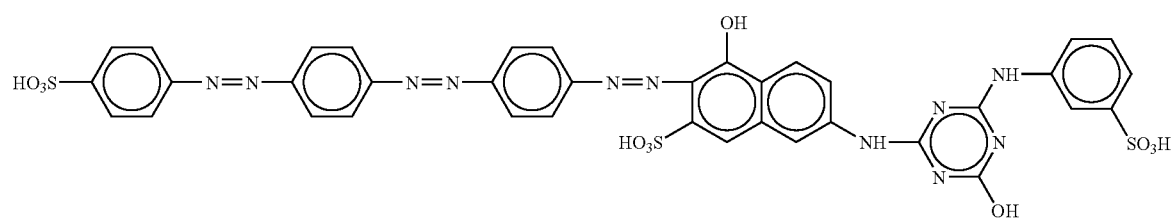
(I-28)
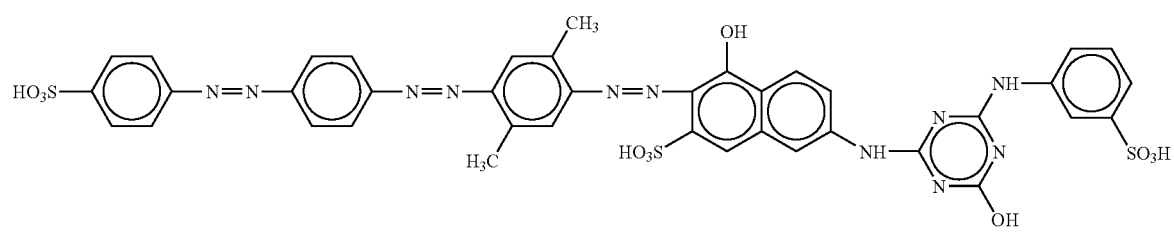
(I-29)
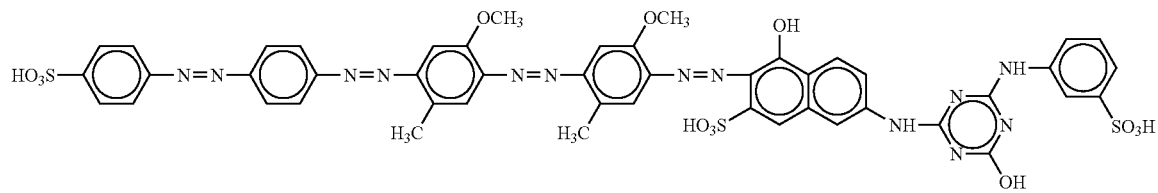

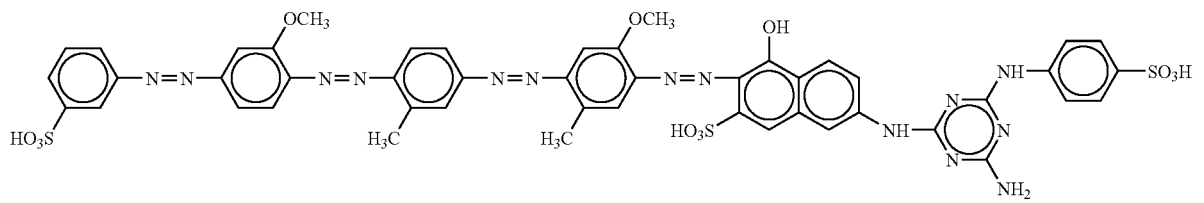

(I-30)

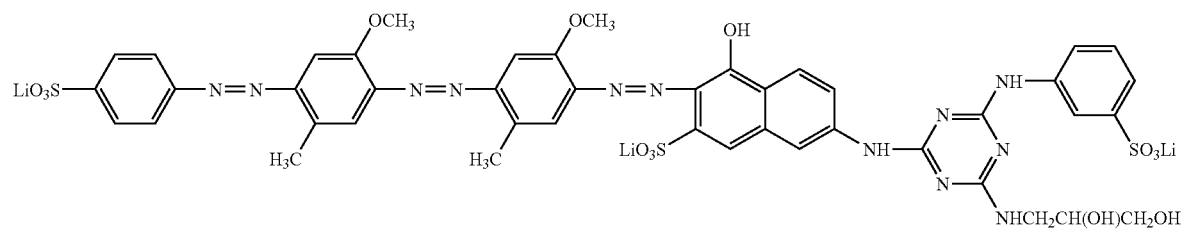

(I-31)

The azo dye represented by the above formula (1) itself may be produced in accordance with a known method. For example, the dye represented by (I-1) may be produced in accordance with the following steps (A) to (E).

(A) In accordance with a conventional method (for example, "Shin Senryo Kagaku (New Dye Chemical)", Yutaka Hosoda (published on Dec. 21, 1973, GIHODO SHUPPAN Co., Ltd.), pages 396-409), a monoazo compound is produced from 4-aminobenzenesulfonic acid (sulfanilic acid) and 2-methoxy-5-methylaniline by means of diazotization and coupling.

(B) The obtained monoazo compound is subjected to diazotization and coupling reaction with 2-methoxy-5-methylaniline in accordance with a conventional method in the same manner to produce a disazo compound.

(C) 6-Amino-1-naphthol-3-sulfonic acid (J acid) is dissolved in water so that pH becomes 6, and the solution is cooled to 0 to 5° C. Cyanuric chloride is added thereto, and reaction is carried out for 2 hours while maintaining the temperature at from 0 to 5° C., to complete the reaction. Then, at room temperature, a 3-aminobenzenesulfonic acid (metanillic acid) aqueous solution is added thereto, to carry out a condensation reaction at a pH of from 6 to 7 for several hours.

(D) Diazotization is carried out in accordance with a conventional method, e.g. by dissolving the disazo compound obtained in step (B) by adding water and N-methyl-2-pyrrolidone thereto and employing a 25 wt % caustic soda aqueous solution to bring the pH 9, followed by cooling to from 0 to 5° C. The obtained product and the condensation reaction product obtained in step (C) are subjected to coupling reaction to produce a trisazo compound. After completion of the reaction, the temperature is increased to 60° C., a 25 wt % sodium hydroxide aqueous solution is added to make the mixture strongly alkaline, and hydrolysis is carried out to complete the reaction.

(E) After cooling, salting out is carried out with sodium chloride to obtain an aimed dye No. (I-1).

Further, particularly, the anisotropic dye film of the present invention preferably contains an azo dye for an anisotropic dye film to be formed by a wet film-forming method, of which the free acid form is represented by the following formula (2):

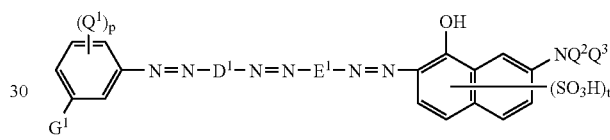

(2)

wherein each of $D^1$ and $E^1$ which are independent of each other, represents a phenylene group which may have a substituent, or a naphthylene group which may have a substituent, $G^1$ represents a carboxyl group, a sulfo group or a phosphoric group, $Q^1$ represents a halogen atom, a hydroxyl group, a nitro group, an amino group which may have a substituent, a $C_{1-4}$ alkyl group which may have a substituent, a $C_{1-3}$ alkoxy group which may have a substituent, a carboxyl group or a sulfo group, each of $Q^2$ and $Q^3$ which are independent of each other, represents a hydrogen atom, a $C_{1-4}$ alkyl group which may have a substituent, or a phenyl group which may have a substituent, p represents 0 or 1, and t represents 1 or 2.

Now, the trisazo dye represented by the above formula (2) will be explained.

The trisazo dye is a water soluble black dichroic dye. The trisazo dye has such a molecular structure that substituents which impart strong attraction force to other molecules are disposed at specific positions on both ends of the molecular major axis, and has hydrophobicity on $D^1$ and $E^1$. Accordingly, the respective molecules have an interaction (hydrophobic interaction) due to hydrophobicity, and the respective molecules are likely to be in an association state.

Namely, (i) it is considered that since the respective dye molecules have substituents which impart strong attraction force to other molecules on both ends of the molecular major axis, they are attracted to each other and likely to be in an association state. Further, (ii) it is considered that since the respective molecules have hydrophobicity on $D^1$ and $E^1$, the moieties having hydrophobicity are attracted to each other in the aqueous solution, and likely to be in an association state. Further, (iii) it is considered that since the substituents which impart a strong attraction force to other molecules on both ends of the molecular major axis are on the specific positions (the phenyl group having a substituent at the 3-position and the naphthyl group having an amino group at the 7-position), the substituent at the 3-position and the amino group at the 7-position can get close to each other due to the positional relationship, at the time of salt forming, whereby they are strongly attracted to each other and likely to be in a stable association state.

It is considered that the azo dye represented by the above formula (2) forms a high lyotropic liquid crystal state due to the above three factors (i) to (iii) by which an association state is likely to be achieved.

Further, not only the azo dye represented by the above formula (2) is black, but also the dye or a composition containing this dye can provided a high degree of molecular orientation state by means of a process specific to the wet film-forming method i.e. a lamination process by e.g. coating on the surface of a substrate. This means that it is possible to form an achromatic dye film with high anisotropy.

Heretofore, when it is attempted to obtain an achromatic anisotropic dye film by using one type of a dichroic dye, the molecular orientation is likely to be disturbed by the steric repulsion of substituents introduced to the dye molecules, and it has been difficult to obtain high dichromatic properties. Accordingly, in a case of a conventional wet film-forming method, an achromatic anisotropic dye film is obtained by combination of a plural types of dyes in many cases. However, the azo dye represented by the above formula (2) has a specific dye structure as mentioned above, and thus forms a highly lyotropic liquid crystallinity and provides a high degree of molecular orientation state, and it is possible to provide black color only with one type of the dye. Accordingly, a composition containing the azo dye represented by the above formula (2) can provide an anisotropic dye film having high dichromatic properties.

In the above formula (2), each of $D^1$ and $E^1$ represents a phenylene group which may have a substituent, or a naphthylene group which may have a substituent. The phenylene group is preferably a 1,4-phenylene group, and the naphthylene group is preferably a 1,4-naphthylene group, in order to obtain the hydrophobic interaction. The substituent of the phenylene group is preferably a group having low polarity, such as a $C_{1-4}$ alkyl group which may have a substituent (such as a methyl group, an ethyl group, a n-propyl group or a n-butyl group), a $C_{1-4}$ alkoxy group which may have a substituent (such as a methoxy group, an ethoxy group, a n-propoxy group or a n-butoxy group), or a $C_{2-7}$ acylamino group which may have a substituent (such as an acetylamino group or a benzoylamino group), in view of improvement in association properties by the hydrophobic interaction in formation of lyotropic liquid crystals.

The substituent of the naphthylene group is preferably a group having low polarity, such as a $C_{1-4}$ alkoxy group which may have a substituent (such as a methoxy group or an ethoxy group), in view of improvement in association properties by the hydrophobic interaction in formation of lyotropic liquid crystals. The substituent which the above alkyl group, alkoxy group and acylamino group may have, may, for example, be a hydroxy group, an alkyl group or an alkoxy group.

$G_1$ is preferably a sulfo group, a carboxy group or a phosphoric group, which is a substituent which imparts strong attraction force as mentioned above, and particularly preferred is a sulfo group with a view to imparting attraction force in a wide pH range.

$Q_1$ represents a halogen atom, a hydroxyl group, a nitro group, an amino group which may have a substituent (preferably an acylamino group such as an acetylamino group or a benzoylamino group), a $C_{1-4}$ alkyl group which may have a substituent (such as a methyl group or an ethyl group), a $C_{1-3}$ alkoxy group which may have a substituent, a carboxyl group or a sulfo group. Particularly preferred is a hydrogen atom, a hydroxyl group, a carboxyl group or a sulfo group. The substituent which the above alkyl group or alkoxy group may have, may, for example be a hydroxyl group, an alkyl group or an alkoxy group.

Each of $Q^2$ and $Q^3$ which are independent of each other, is a hydrogen atom, a $C_{1-4}$ alkyl group which may have a substituent (such as a methyl group or an ethyl group), or a phenyl group which may have a substituent, and particularly preferably, either $Q^2$ or $Q^3$ is a hydrogen atom. The substituent which the above alkyl group or phenyl group may have, may, for example, be a hydroxy group, a carboxyl group or a sulfo group.

p represents 0 or 1, and t represents a number of 1 or 2.

With respect to the azo dye represented by the above formula (2), in its dye structure, by specifying the substituents on both ends of the molecular major axis and the substitution positions (the phenyl group having a substituent at the 3-position and the naphthyl group having an amino group at the 7-position), and by specifying $D^1$ and $E^1$ which have the hydrophobic interaction, the association properties improve, and a highly lyotropic liquid crystal state can be formed, as explained above in detail. Accordingly, the azo dye represented by the above formula (2) is suitable as a dye for an anisotropic dye film to be formed by a wet film-forming method, and further has a high dichroic ratio. Accordingly, by employing a dye composition using the dye for an anisotropic dye film, an anisotropic dye film having high dichromatic properties can be obtained.

The azo dye represented by the above formula (2) provides black color, and particularly preferably it is a dye having an excitation purity of from 0% to 12%. Namely, by employing a dye having an excitation purity of from 0% to 12%, disturbance of the molecular orientation by mixing of different molecules will not occur, and high dichromatic properties can be obtained.

Here, the excitation purity is obtained in such a manner that the chromaticity coordinates N of standard illuminant and the chromaticity coordinates C of the obtained dye in the chromaticity diagram are connected with a straight line, and the wavelength corresponding to the intersection point of the extension of the straight line and the spectrum locus is taken as the dominant wavelength, and the excitation purity is calculated from the proportion at the respective points. The chromaticity coordinate C can be obtained in such a manner that the dye is added to water to obtain a dye aqueous solution, the visible light transmittance of the aqueous solution is measured by a spectrophotometer, and the chromaticities x and y in the CIE 1964 supplementary standard calorimetric system under standard illuminant $D_{65}$ are calculated.

The excitation purity of the dye in the present invention means one measured and calculated as the dye aqueous solution obtained by adding the dye to water.

Further, the calculation method may be in accordance with a known method as disclosed in e.g. "New Color Science Handbook" edited by THE COLOR SCIENCE ASSOCIATION OF JAPAN (UNIVERSITY OF TOKYO PRESS, published on Nov. 25, 1989 (second edition)), pages 104 to 105.

The azo dye represented by the above formula (2) is preferably a dye having an excitation purity of at least 0% and at most 12%, however, the excitation purity is at least 0%, and more preferably at most 9%, most preferably at most 6%.

Further, the molecular weight of the dye represented by the above formula (2) in the free acid form is usually at least 595 and usually at most 1,500, preferably at most 1,200.

As specific examples of the dye represented by the above formula (2), dyes having structures represented by (II-1) to (II-15) may be mentioned, however, the dye is not limited thereto.

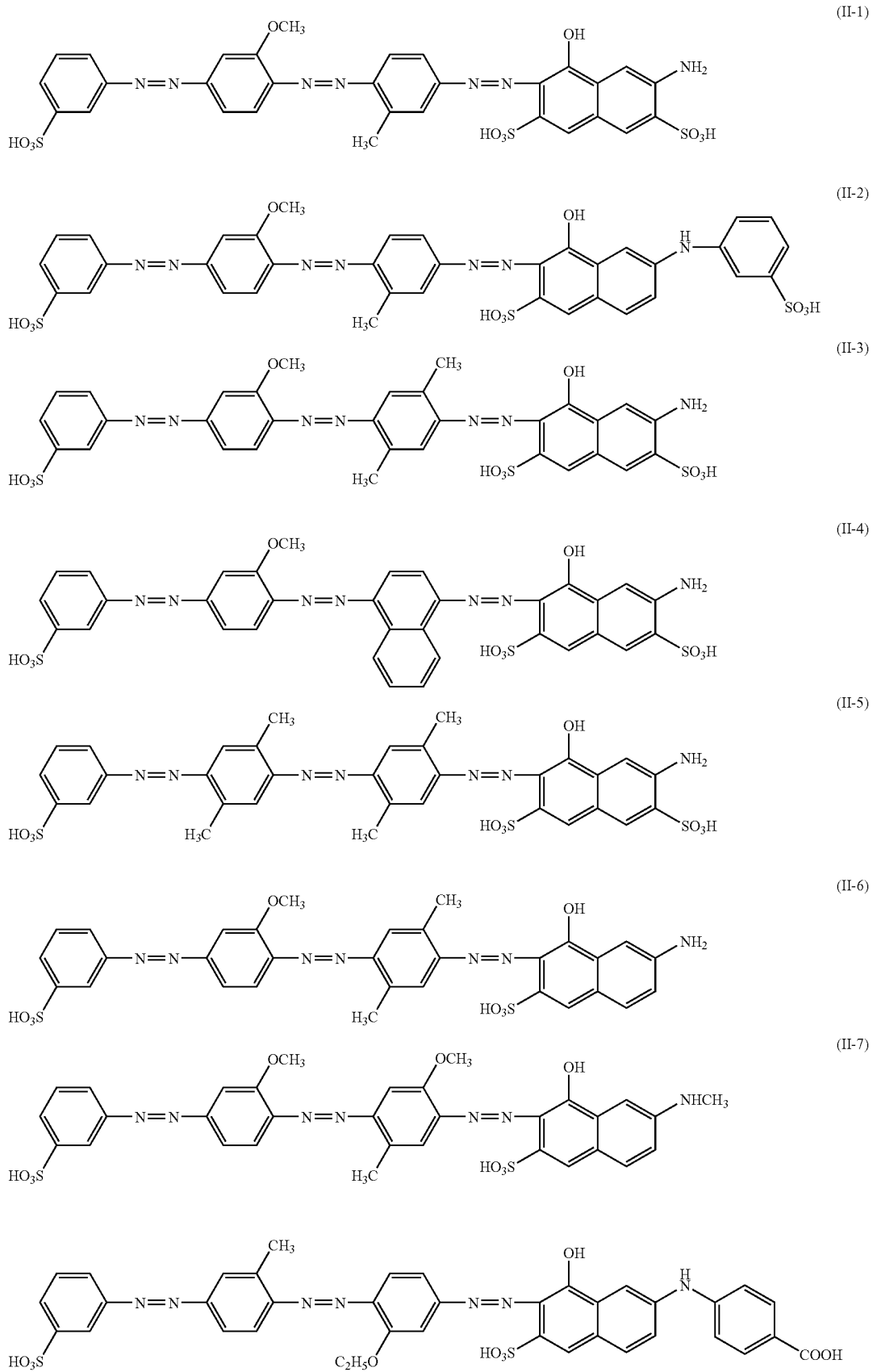

-continued
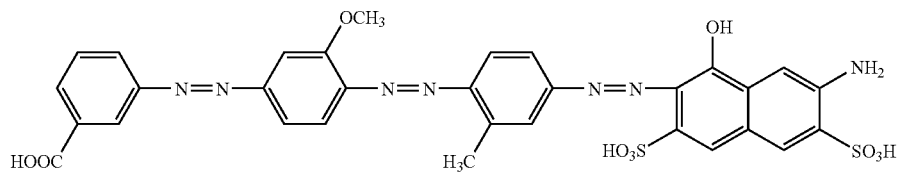
(II-9)
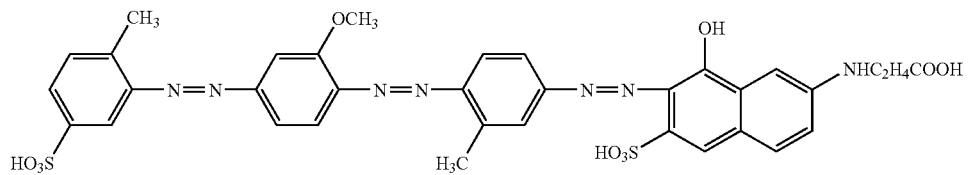
(II-10)
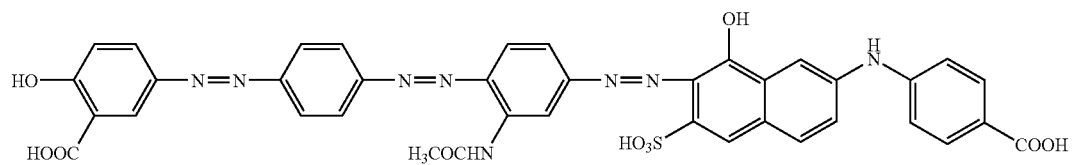
(II-11)
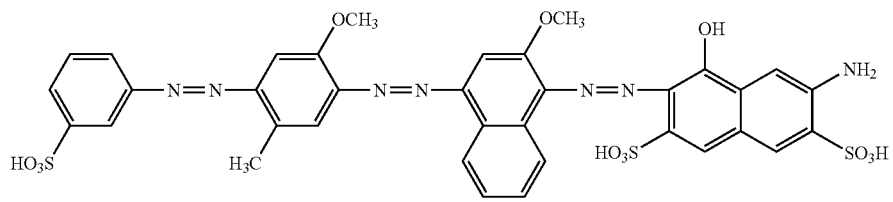
(II-12)
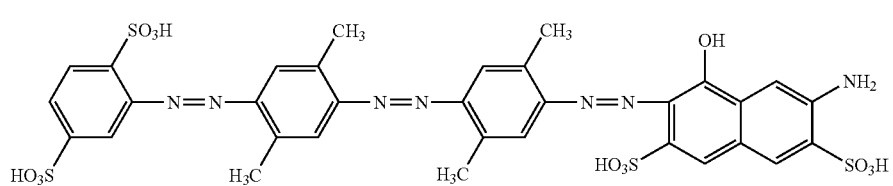
(II-13)
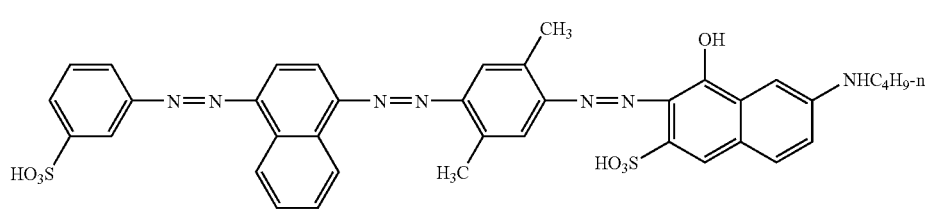
(II-14)

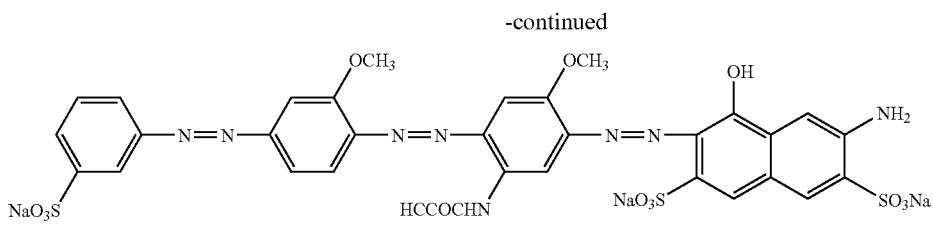

(II-15)

The azo dye represented by the above formula (2) itself may be produced in accordance with a known method. For example, the dye represented by (II-1) may be produced in accordance with the following steps (a) to (c).

(a) In accordance with a conventional method (such as "Shin Senryo Kagaku (New Dye Chemical)", Yutaka Hosoda (published on Dec. 21, 1973, GIHODO SHUPPAN Co., Ltd.), pages 396-409), a monoazo compound is produced from 3-aminobenzenesulfonic acid (metanillic acid) and 2-methoxyaniline (o-anisidine) by means of diazotization and coupling.

(b) The obtained monoazo compound is subjected to diazotization and coupling reaction with 3-methylaniline (m-toluidine) in accordance with a conventional method in the same manner to produce a disazo compound.

(c) The obtained disazo compound is subjected to diazotization and coupling reaction with 7-amino-1-naphthol-3,6-disulfonic acid (RR acid) in accordance with a conventional method in the same manner, and salting out is carried out with sodium chloride to obtain a desired dye No. (II-1).

Particularly, the dye represented by the above structural formula (II-1) forms lyotropic liquid crystals in the aqueous solution, and accordingly an anisotropic dye film having high dichromatic properties can be prepared with it, and it is a useful dye particularly suitable for the wet film-forming method.

The anisotropic dye film of the present invention preferably contains a dye represented by (I-1), (I-31), (II-3) or (II-15) among the above exemplified dyes.

Among the dyes to be used in the present invention, a dye having an acidic group may be used as the free acid form, or part of the acidic groups may be in a salt form. Otherwise, a dye in a salt form and a dye in a free acid from may coexist. Further, when the dye is obtained in a salt form at the time of production, it may be used as it is, or it may be converted into a desired salt form. As the method of converting the salt form, a known method may optionally be employed, and the following methods may, for example, be mentioned.

1) A method of adding a strong acid such as hydrochloric acid to an aqueous solution of a dye obtained in a salt form, to precipitate the dye in a free acid form, and then neutralizing the dye acidic groups with an alkali solution having desired counter ions (such as lithium hydroxide or sodium hydroxide) to carry out salt exchange.

2) A method of adding a normal salt having desired counter ions (such as lithium chloride or sodium chloride) in a large excess to an aqueous solution of the dye obtained in a salt form, to carry out salt exchange in the form of a salted out cake.

3) A method of treating an aqueous solution of the dye obtained in a salt form with a strongly acidic ion exchange resin to precipitate the dye in a free acid form, and neutralizing the dye acidic groups with an alkali solution having desired counter ions (such as lithium hydroxide or sodium hydroxide) to carry out salt exchange.

4) A method of reacting an aqueous solution of the dye obtained in a salt form with a strongly acidic ion exchange resin which is preliminarily treated with an alkali solution having desired counter ions (such as lithium hydroxide or sodium hydroxide) to carry out salt exchange.

Whether the acidic group is in a free acid form or in a salt form depends on the pKa of the dye and the pH of the dye aqueous solution.

As examples of the above salt form, a salt of an alkali metal such as Na, Li or K, a salt of ammonium which may be substituted by a $C_{1-16}$ alkyl group or a $C_{1-12}$ hydroxyalkyl group, and a salt of an organic amine may be mentioned. As examples of the organic amine, a $C_{1-6}$ lower alkylamine, a $C_{1-6}$ lower alkylamine substituted by a hydroxyl group, and a $C_{1-6}$ lower alkylamine substituted by a carboxy group may, for example, be mentioned. In a case of such a salt form, the type is not limited to one type, and a plural types may be present.

In the present invention, the above-described dyes may be used alone, or at least two types may be used in combination, and a dye other than the above-exemplified dyes may be blended to the extent of not decreasing the orientation, whereby anisotropic dye films having various hues can be produced. Particularly, a deep color tone film is preferred when used for a polarizing film, and a formulation with which the hue represents a neutral color in a visible wavelength region of from 380 to 780 nm (neutral black, e.g. one which satisfies $\sqrt{\{(a^*)^2+(b^*)^2\}} \leq 5$ in the L*a*b* color system) is preferred as a polarizer for a display device, particularly for a color display device.

As examples of a blending dye when another dye is blended, C.I. Direct Yellow 12, C.I. Direct Yellow 34, C.I. Direct Yellow 86, C.I. Direct Yellow 142, C.I. Direct Yellow 132, C.I. Acid Yellow 25, C.I. Direct Orange 39, C.I. Direct Orange 72, C.I. Direct Orange 79, C.I. Acid Orange 28, C.I. Direct Red 39, C.I. Direct Red 79, C.I. Direct Red 81, C.I. Direct Red 83, C.I. Direct Red 89, C.I. Acid Red 37, C.I. Direct Violet 9, C.I. Direct Violet 35, C.I. Direct Violet 48, C.I. Direct Violet 57, C.I. Direct Blue 1, C.I. Direct Blue 67, C.I. Direct Blue 83, C.I. Direct Blue 90. C.I. Direct Green 42, C.I. Direct Green 51 and C.I. Direct Green 59 may, for example, be mentioned.

The anisotropic dye film of the present invention is prepared preferably by using a dye composition for an anisotropic dye film containing at least a dye, by a dry film-forming method or a wet film-forming method as mentioned hereinafter. For the dye composition for an anisotropic dye film of the present invention, the above dyes may be used alone, or a plurality of the above dyes or a mixture with another dye to the extent of not decreasing the orientation, may be used, whereby anisotropic dye films having various hues can be produced.

The dye composition for an anisotropic dye film of the present invention usually contains a solvent, and usually the dye is dissolved or dispersed in a solvent. The dye contained in the dye composition for an anisotropic dye film is preferably the dye represented by the above formula (1) or (2) also in view of e.g. the solubility in a solvent. Further, in the composition, an additive such as a surfactant or a pH adjustor may be blended. Such an additive also is usually dissolved in a solvent and used.

As the solvent, water, a water-miscible organic solvent or a mixture thereof is suitable. As specific examples of the organic solvent, an alcohol such as methyl alcohol, ethyl alcohol, isopropyl alcohol or glycerol, a glycol such as ethylene glycol or diethylene glycol, or a cellosolve such as methylcellosolve or ethyl cellosolve may, for example, be used alone or as a mixed solvent of at least two types thereof.

In a case where the dye composition for an anisotropic dye film is a solution containing such a solvent, the concentration of the dye in the dye composition for an anisotropic dye film is usually at least 0.01 wt %, preferably at least 0.1 wt %, more preferably at least 0.5 wt %, and usually at most 50 wt %, preferably at most 30 wt %, more preferably at most 25 wt %, particularly preferably at most 20 wt %, most preferably at most 15 wt %, although it depends on the film-forming method, the solubility of the dye and the formation concentration of the supermolecular structure such as the lyotropic liquid crystal state. If the dye concentration is too low, no sufficient dichromatic properties of the anisotropic dye film to be obtained may be obtained, and if the concentration is too high, the dye may separate out.

To the dye composition for an anisotropic dye film, an additive such as a surfactant may be added as the case requires, in order to improve wettability and the coating properties on a substrate. As the surfactant, any of anionic, cationic and nonionic surfactants may be used. The addition concentration, as the concentration in the dye composition for an anisotropic dye film, is usually preferably at least 0.05 wt % and at most 5 wt %, more preferably at most 0.5 wt %, which is an amount sufficient to obtain the aimed effects and in which the orientation of the dye molecules will not be impaired.

Further, for the purpose of e.g. inhibiting the instability such as salt forming and aggregation of the dye in the dye composition for an anisotropic dye film, a known pH adjustor such as an acid or an alkali, etc. may be added before, after or during the mixing of the constituting components of the dye composition for an anisotropic dye film, to adjust the pH. The pH of the dye composition is adjusted to be preferably at least 3, more preferably at least 4, and preferably at most 13, more preferably at most 12, in view of the stability of the solution and handling efficiency in production.

Further, as additives other than the above, known additives as disclosed in "Additive for Coating", edited by J. Bieleman, Willey-VCH (2000) may be used.

The anisotropic dye film of the present invention is prepared preferably by using the dye composition for an anisotropic dye film containing at least a dye, by a dry film-forming method or a wet film-forming method as mentioned hereinafter. However, the anisotropic dye film of the present invention is preferably an anisotropic dye film formed by a wet film-forming method rather than by a dry film-forming method e.g. by stretching a film, since the molecular alignment properties in the anisotropic dye film is increased, and high dichromatic properties are obtained by utilizing the intermolecular interaction among the dye molecules.

The azo dye represented by the above formula (1), particularly the dye which forms lyotropic liquid crystals in the aqueous solution, as represented by the above structural formula (I-1), can be used to prepare a polarizing film (anisotropic dye film) having high dichromatic properties by a wet film-forming method, and is useful. Many of the azo dyes of the present invention, of which the free acid forms are represented by the above formula (1), have high dichromatic properties and form lyotropic liquid crystals in the aqueous solution, and have high affinity is various substrate surfaces, and accordingly they are suitable for such a film-forming method.

Further, the trisazo dye represented by the above formula (2) has a specific dye structure and therefore forms a high degree of lyotropic liquid crystal state, provides a high degree of molecular alignment state, and further, it provides black color only with one type of the dye and therefore can provide high dichromatic properties.

The wet film-forming method is preferred also in such a viewpoint that an anisotropic dye film can be formed on a high heat resistant substrate such as glass, and a high heat resistant polarizing element can be obtained, which can be used for applications for which a high heat resistance is required, such as a liquid crystal projector or an on-vehicle display panel.

Among the film-forming methods for an anisotropic dye film, the dry film-forming method may, for example, be a method of forming a high polymer into a film, followed by dyeing with a dye composition for an anisotropic dye film, a method of stretching a non-stretched film obtained by e.g. a method of adding a dye composition for an anisotropic dye film to a solution of a high polymer to carry out solution dyeing, followed by film formation, or a method of evaporating a dye composition for an anisotropic dye film by heating in a vacuum so that it is deposited on a substrate such as glass in a vacuum. As the constituting material of the film to be dyed with the dye composition for an anisotropic dye film, a polymer material having high affinity with the dye, such as polyvinyl alcohol may be mentioned.

The wet film-forming method may be a known method such as a method in which the above-described dye composition for an anisotropic dye film is prepared into a coating liquid, which is coated on a substrate such as a glass plate and dried so that the dye is orientated and laminated.

For example, a known method as disclosed in e.g. "Coating Engineering", Yuji Harasaki (Asaku Shoten K. K., published on Mar. 20, 1971) pages 253-277 or "Creation and Applications of Harmonized Molecular Materials" supervised by Kunihiro Ichimura (CMC Publishing Co., Ltd., published on Mar. 3, 1998) pages 118-149, or a method of coating on a substrate preliminarily subjected to an alignment treatment by means of e.g. spin coating, spray coating, bar coating, roll coating or blade coating, may be mentioned.

The temperature at the time of coating the dye composition for an anisotropic dye film on a substrate is usually at least 0° C. and at most 80° C., preferably at most 40° C. Further, the humidity is usually at least 10% RH, preferably at least 30% RH and usually at most 80% RH.

In the wet film-forming method, a dye film is formed by means of a step of coating the dye composition for an anisotropic dye film on the substrate and a drying step. The operation conditions in such steps are preferably adjusted so as to maintain the high degree of the molecular orientation state formed based on the high lyotropic liquid crystal properties by self-assembly of the dye, and to obtain the anisotropic dye film of the present invention which satisfies the above-described molecular stacking period and molecular column length.

Therefore, a quick increase in the temperature is unfavorable particularly in the drying step, and air drying is usually preferred. As preferred conditions, the temperature at the time of drying is usually at least 0° C., preferably at least 10° C., and usually at most 120° C., preferably at most 110° C. Further, the humidity is usually at least 10% RH, preferably at least 30% RH, and usually at most 80% RH.

As the substrate, glass or a resin film of triacetate, acryl, polyester, triacetylcellulose or urethane type may, for example, be mentioned. Further, on the surface of the substrate, an alignment treatment layer, a fluororesin layer etc. may be formed by a known method as disclosed in e.g. "Ekisho Binran (Liquid Crystal Handbook)" (Maruzen Company, Limited, published on Oct. 30, 2000) pages 226-239, so as to control the alignment direction of the dichroic dye. Further, modification of e.g. the surface energy state may be carried out by use of e.g. irradiation with light, corona treatment or plasma treatment in combination.

It is preferred that a protective layer is provided on the surface of the anisotropic dye film of the present invention. The protective layer is formed by lamination of a transparent polymer film such as a triacetate, acryl, polyester, polyimide, triacetylcellulose or urethane type film and is used practically.

Such an anisotropic dye film of the present invention has a high dichroic ratio, and the dichroic ratio is preferably at least 9, more preferably at least 12, particularly preferably at least 15.

Further, the film thickness of the anisotropic dye film formed on a substrate particularly by the wet film-forming method, as the film thickness usually after drying, is preferably at least 50 nm, more preferably at least 100 nm and preferably at most 50 μm, more preferably at most 10 μm, particularly preferably at most 1 μm.

Further, in a case where the anisotropic dye film of the present invention is used as e.g. a polarizing filter of various display devices such as LCD and OLED, the anisotropic dye film may be formed directly on e.g. an electrode substrate constituting such a display device, or a substrate having the anisotropic dye film formed thereon may be used as a constituting component of such a display device.

The anisotropic dye film of the present invention functions, utilizing light absorption anisotropy, as a polarizing film to obtain e.g. linearly polarized light, circularly polarized light or elliptically polarized light, and further, it may function as various anisotropic films with e.g. refraction anisotropy or conduction anisotropy, by selecting the film formation process and the substrate or the composition containing the dye, and various types of polarizing elements to be used for various applications can be obtained.

The polarizing element of the present invention employs such an anisotropic dye film of the present invention, however, when the anisotropic dye film of the present invention is formed on a substrate to obtain a polarizing element of the present invention, the formed anisotropic dye film itself may be used. Further, it may be used as a laminate by laminating layers having various functions, such as an adhesive layer and an antireflection layer in addition to the above protective layer. In this case, the lamination order may optionally be selected depending upon the purpose of use.

EXAMPLES

Now, the present invention will be explained in further detail with reference to Examples. However, the present invention is by no means restricted to the following Examples within a range not to exceed the gist.

In the following Examples, the molecular stacking period and its column length and the degree of orientation of the molecular stacking axes were obtained by analyzing the diffraction profile by the in-plane measurement by using an X-ray diffraction apparatus for thin film evaluation ("RINT2000PC" in-plane diffraction system, manufactured by Rigaku Corporation) and the rocking profile by the in-plane rocking scan measurement by the above-described method. Both measurements were carried out at an angle of incident of 1° by CuKα.

Further, the dichroic ratio (D) was obtained by measuring the transmittance of the anisotropic dye film by a spectrophotometer in which an iodine type polarizing element is disposed in the incident optical system ("Spectro Multichannel Photodetector MCPD2000" manufactured by OTSUKA ELECTRONICS CO., LTD.), and calculation in accordance with the following formula:

Dichroic ratio $(D)=Az/Ay$ $Az=-\log(Tz)$ $Ay=-\log(Ty)$

Tz: Transmittance of the polarized light in the absorption axis direction of a dye film Ty: Transmittance of the polarized light in the polarization axis direction of a dye film Further, the chromaticities x and y (CIE 1964 supplementary standard calorimetric system, under standard illuminant $D_{65}$) of the anisotropic dye film were calculated by introducing the above Tz and Ty to the method as disclosed in JIS-Z-8701: 1995.

Further, the degree of polarization was obtained by measuring the transmittance of the dye film by a spectrophotometer to obtain the tristimulus values X, Y and Z of non-luminous object colors in CIE 1931 standard colorimetric system in accordance with JIS-Z-8701: 1995, and calculation from the following calculation formula. As the spectral distribution of the standard illuminant used for calculation of the tristimulus values X, Y and Z, the illuminant $D_{65}$ was employed.

Degree of polarization $(\rho)=\{(Y2-Y1)/(Y2+Y1)\}^{1/2}\times 100$

Y2: Tristimulus value Y when two polarization axes of the dye film are laid in parallel with each other Y1: Tristimulus value Y when two polarization axes of the dye film are laid at right angles to each other In the following description, "part(s)" means "part(s) by weight".

(1) Stacking Period and Column Length (Examples 1 to 6 and Comparative Example 1)

Example 1

10 Parts of the following exemplified dye No. (I-31) and 0.2 part of a nonionic surfactant EMULGEN 109P (manufactured by Kao Corporation) were dissolved in 89.8 parts of water with stirring to obtain a dye composition for an anisotropic dye film:

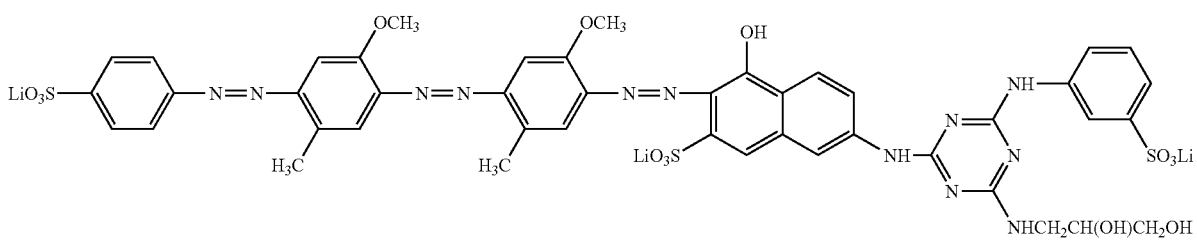

(I-31)

On the other hand, a substrate comprising a glass substrate (75 mm×25 mm, thickness 1 mm) and a polyimide alignment film formed thereon by silk printing (polyimide film thickness: about 800 Å), which was preliminarily subjected to rubbing treatment with cloth, was prepared. The dye composition for an anisotropic dye film was coated on the substrate thus prepared by a bar coater ("No. 3" manufactured by TESTER SANGYO CO., LTD.), followed by air drying to obtain an anisotropic dye film having a film thickness of about 0.4 μm.

Figure 4:
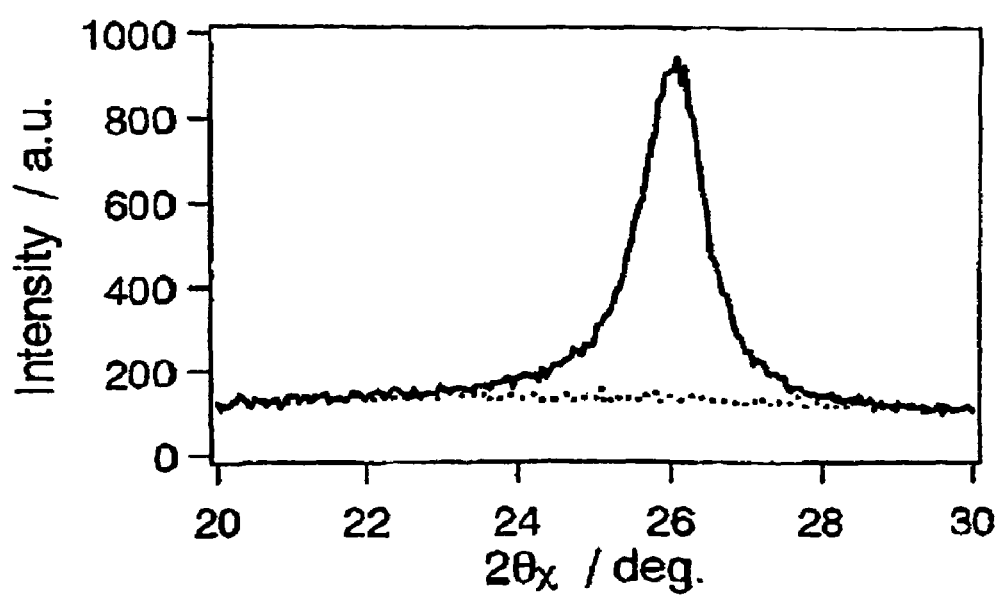
FIG. 4 is a chart illustrating an X-ray diffraction profile of the anisotropic dye film formed in Example 1.
Figure 5:
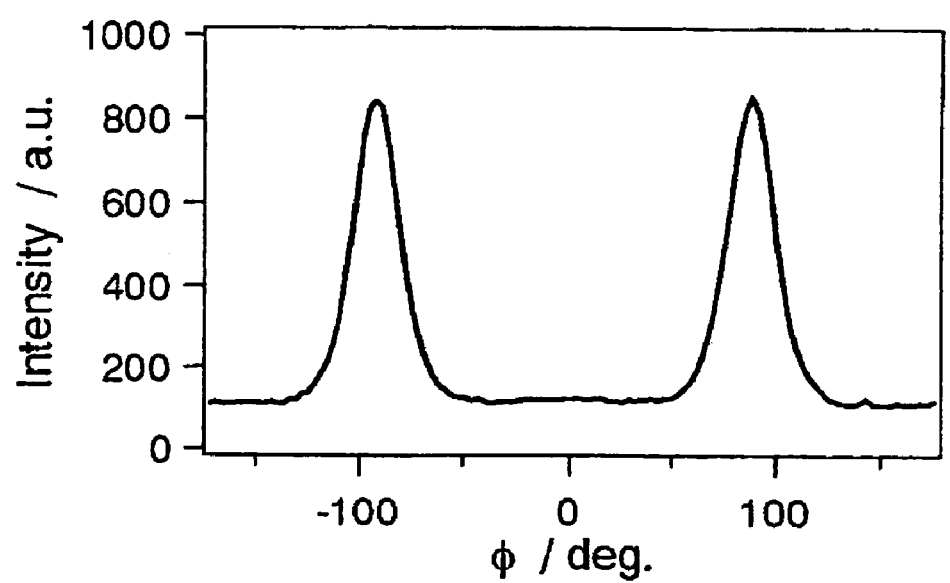
FIG. 5 is a chart illustrating an in-plane rocking profile of the anisotropic dye film formed in Example 1.

The X-ray diffraction profile and the in-plane rocking profile of the obtained anisotropic dye film are shown in FIG. 4 and FIG. 5, respectively. FIG. 4 illustrates the result of the in-plane measurement carried out from two directions, in which the diffracting plane vertical to the polarization axis and the diffracting plane vertical to the absorption axis of the anisotropic dye film were observed. The solid line and the broken line illustrate X-ray diffraction profiles obtained from directions in which the diffracting planes vertical to the polarization axis and the absorption axis were observed, respectively. FIG. 5 illustrates the result of the in-plane rocking curve measurement of the diffraction peak attributable to the molecular stacking of the anisotropic dye film.

Further, the obtained molecular stacking period, column length, degree of orientation of the molecular stacking axes and dichroic ratio are shown in Table 1.

From these results, the anisotropic dye film of the present Example was confirmed to have a molecular alignment suitable to develop the dichroic ratio and have a high dichroic ratio.

Example 2

10 Parts of the following exemplified dye No. (II-15) was dissolved in 90 parts of water with stirring to obtain a dye composition for an anisotropic dye film:

coated on a glass substrate having a polyimide alignment film formed thereon, followed by air drying to obtain an anisotropic dye film.

The molecular stacking period, the column length, the degree of orientation of the molecular stacking axes and the dichroic ratio of the obtained anisotropic dye film were examined and the results are shown in Table 1.

It was confirmed from Table 1 that the anisotropic dye film of the present Example has a molecular alignment suitable to develop the dichroic ratio, and has a high dichroic ratio.

Example 3

8 Parts of the following exemplified dye No. (I-1) was dissolved in 92 parts of water with stirring to obtain a dye composition for an anisotropic dye film:

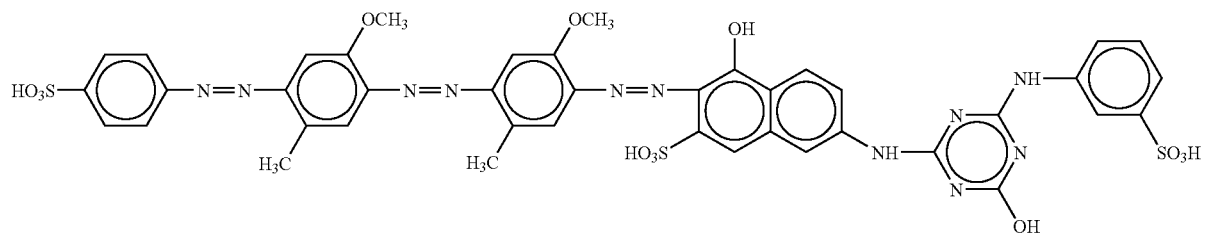

(I-1)

In the same manner as in Example 1 except that an applicator with a gap of 10 μm (manufactured by Imoto Machinery Co., Ltd.) was used, the dye composition for an anisotropic dye film was coated on a glass substrate having a polyimide alignment film formed thereon, followed by air drying to obtain an anisotropic dye film.

The molecular stacking period, the column length, the degree of orientation of the molecular stacking axes and the dichroic ratio of the obtained anisotropic dye film were examined, and the results are shown in Table 1.

It was confirmed from Table 1 that the anisotropic dye film of the present Example has a molecular alignment suitable to develop the dichroic ratio, and has a high dichroic ratio.

Example 4

12 Parts of the above exemplified dye No. (I-31) was dissolved in 80 parts of water with stirring, and 8 parts of glycerol was added thereto to obtain a dye composition for an anisotropic dye film.

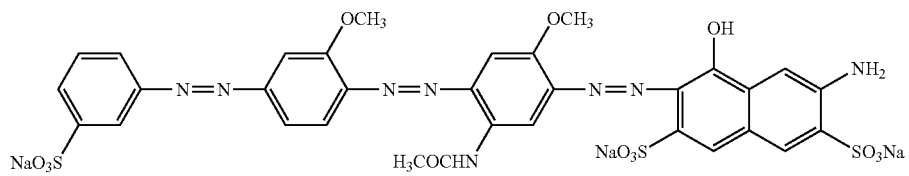

(II-15)

In the same manner as in Example 1 except that a bar coater ("No. 2" manufactured by TESTER SANGYO CO., LTD.) was used, the dye composition for an anisotropic dye film was In the same manner as in Example 1 except that an applicator with a gap of 10 μm (manufactured by Imoto Machinery Co., Ltd.) was used, the dye composition for an anisotropic dye film was coated on a glass substrate having a polyimide alignment film formed thereon, followed by air drying to obtain an anisotropic dye film.

The molecular stacking period, the column length, the degree of orientation of the molecular stacking axes and the dichroic ratio of the obtained anisotropic dye film were examined, and the results are shown in Table 1.

It was confirmed from Table 1 that the anisotropic dye film of the present Example has a molecular alignment suitable to develop the dichroic ratio and has a high dichroic ratio.

Example 5

15 Parts of the following exemplified dye No. (II-3) was dissolved in 76 parts of water with stirring, and 9 parts of glycerol was added thereto to obtain a dye composition for an anisotropic dye film:

It was confirmed from Table 1 that the anisotropic dye film of the present Example has a molecular alignment suitable to develop the dichroic ratio and has a high dichroic ratio.

Comparative Example 1

6 Parts of a dye having the following structural formula was added to 94 parts of water and dissolved with stirring, followed by filtration to obtain a dye composition for an anisotropic dye film:

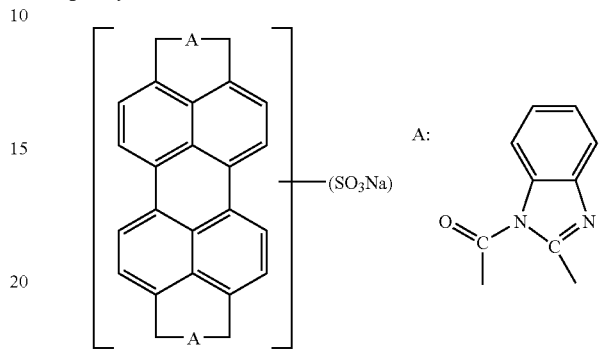

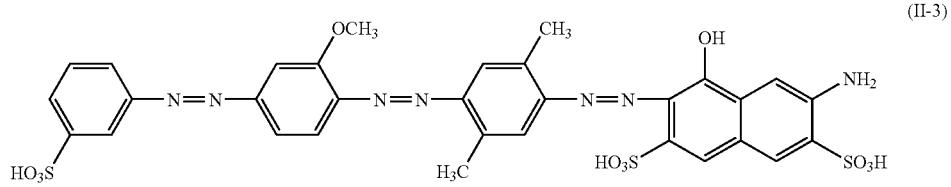

In the same manner as in Example 1 except that a bar coater ("No. 2" manufactured by TESTER SANGYO CO., LTD.) was used, the dye composition for an anisotropic dye film was coated on a glass substrate having a polyimide alignment film formed thereon, followed by air drying to obtain an anisotropic dye film.

The molecular stacking period, the column length, the degree of orientation of the molecular stacking axes and the dichroic ratio of the obtained anisotropic dye film were examined, and the results are shown in Table 1.

It was confirmed from Table 1 that the anisotropic dye film of the present Example has a molecular alignment suitable to develop the dichroic ratio and has a high dichroic ratio.

Example 6

15 Parts of the above exemplified dye No. (II-3) was dissolved in 85 parts of water with stirring to obtain a dye composition for an anisotropic dye film:
In the same manner as in Example 1 except that a bar coater ("No. 2" manufactured by TESTER SANGYO CO., LTD.) was used, the dye composition for an anisotropic dye film was coated on a glass substrate having a polyimide alignment film formed thereon, followed by air drying to obtain an anisotropic dye film.

The molecular stacking period, the column length, the degree of orientation of the molecular stacking axes and the dichroic ratio of the obtained anisotropic dye film were examined, and the results are shown in Table 1.

The dye composition for an anisotropic dye film was coated on a slide glass ("Colorless edge polish frosted slide glass No. 1" manufactured by MATSUNAMI GLASS IND., LTD.) by a bar coater ("No. 2" manufactured by Coating TESTER KOGYO K. K.), followed by air drying to obtain an anisotropic dye film.

The molecular stacking period, the column length, the degree of orientation of the molecular stacking axes and the dichroic ratio of the obtained anisotropic dye film were examined, and the results are shown in Table 1.

It is estimated from Table 1 that in the anisotropic dye film of this Comparative Example, the column length is less than 105 Å, and the number of the molecules aligned suitably to develop the dichroic ratio is insufficient, and accordingly the anisotropic dye film has a low dichroic ratio.

TABLE 1

|  | Stacking period (Å) | Column length (Å) | Degree of orientation (%) | Dichroic ratio |
|---|---|---|---|---|
| Example 1 | 3.415 | 107.6 | 91.0 | 16.9 |
| Example 2 | 3.388 | 132.3 | 93.4 | 18.7 |
| Example 3 | 3.419 | 115.1 | 90.9 | 23.4 |
| Example 4 | 3.422 | 136.8 | 94.3 | 23.0 |
| Example 5 | 3.420 | 166.9 | 94.7 | 45.3 |
| Example 6 | 3.394 | 128.0 | 95.6 | 22.7 |
| Comparative Example 1 | 3.412 | 101.3 | 92.7 | 10.1 |

(2) Preparation of Azo Dye Represented by the Formula (2) (Preparation Example 1)

Preparation Example 1

The following dye No. (I-31) was prepared in accordance with the following steps (A) to (E):

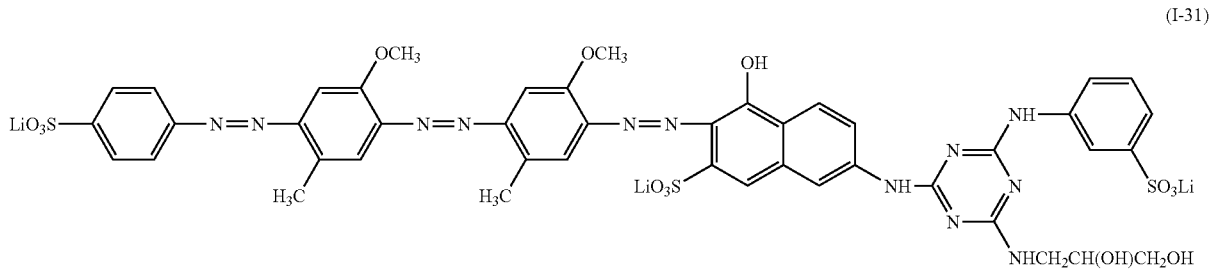

(I-31)

(A) In accordance with a conventional method (for example, as "Shin Senryo Kagaku (New Dye Chemical)", Yutaka Hosoda (published on Dec. 21, 1973, GIHODO SHUPPAN Co., Ltd.), pages 396-409), a monoazo compound was produced from 4-aminobenzenesulfonic acid (sulfanillic acid) and 2-methoxy-5-methylaniline by means of diazotization and coupling.

(B) The monoazo compound obtained in step (A) was subjected to diazotization and coupling reaction with 2-methoxy-5-methylaniline in accordance with a conventional method in the same manner to produce a disazo compound.

(C) Separately, 6-amino-1-naphthol-3-sulfonic acid (J acid) was dissolved in water so that the pH became 6, and the solution was cooled to 0 to 5° C. Cyanuric chloride was added thereto, and reaction was carried out for 2 hours while maintaining the temperature at from 0 to 5° C., to complete the reaction. Then, at room temperature, a 3-aminobenzenesulfonic acid (metanillic acid) aqueous solution was added thereto, to carry out a condensation reaction at a pH of from 6 to 7 for several hours.

(D) The disazo compound obtained in step (B) was subjected to diazotization and coupling reaction with the compound obtained in step (C) in accordance with a conventional method in the same manner to produce a trisazo compound. After completion of the reaction, 3-amino-1,2-propanediol was added, the temperature was increased to 60° C., and a 25 wt % sodium hydroxide aqueous solution was added to bring the pH to from 9 to 9.5, and the reaction was completed.

(E) After cooling, salting out was carried out with sodium chloride to obtain an aimed dye No. (I-31).

(3) Preparation of Anisotropic Dye Film (Examples 7 to 17 and Comparative Examples 2 to 7)

Example 7

10 Parts of the dye No. (I-1) and 0.2 part of a nonionic surfactant EMULGEN 109P (manufactured by Kao Corporation) were added to 100 parts of water, followed by neutralization with a 5 wt % lithium hydroxide aqueous solution to bring the pH to 8.0, dissolution with stirring and filtration to obtain a dye aqueous solution (composition for anisotropic dye film formation). The dye aqueous solution was dropped on a slide glass, and the process of concentration by drying was observed by a polarization microscope, whereupon it was confirmed that the solution was an isotropic solution at the initial stages, but was formed into a lyotropic liquid crystal state by the concentration by drying.

On the other hand, a substrate comprising a glass substrate and a polyimide alignment film formed on the glass substrate by silk printing (polyimide film thickness: about 800 Å), which was preliminarily subjected to rubbing treatment with cloth, was prepared. The dye aqueous solution was coated on the substrate thus prepared by a bar coater (No. 3 manufactured by TESTER SANGYO CO., LTD.), followed by drying at room temperature to obtain an anisotropic dye film.

Figure 6:
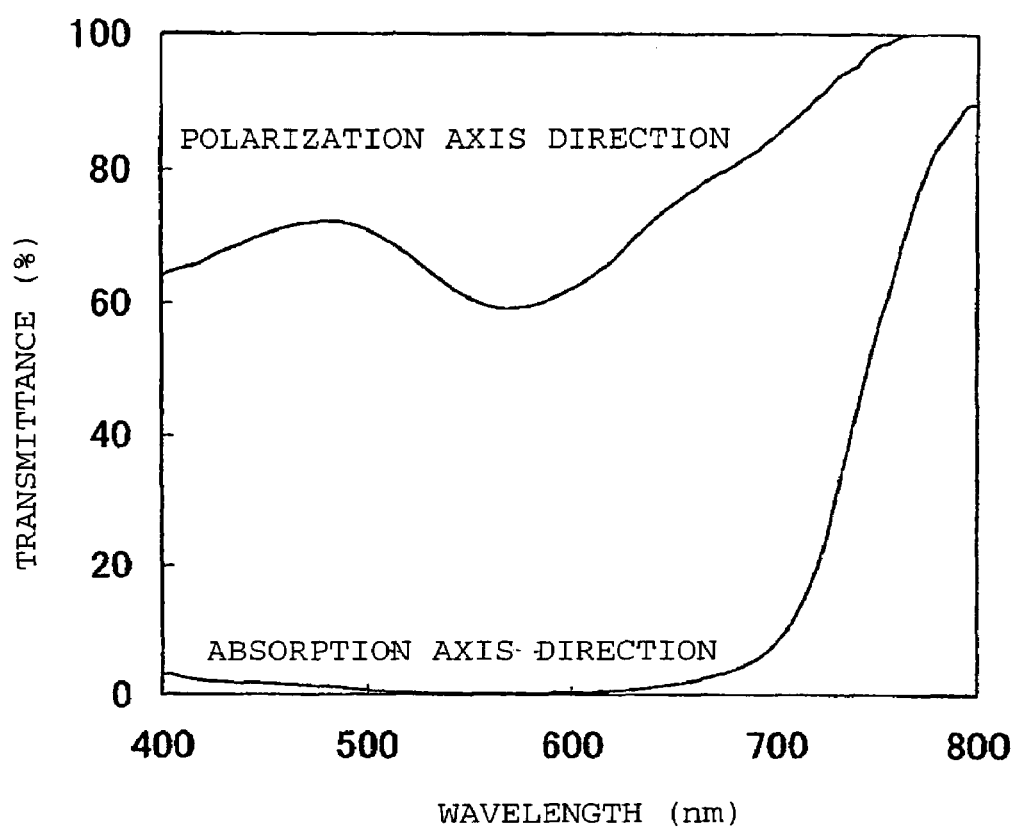
FIG. 6 is a graph illustrating light transmittances in an absorption axis direction and in a polarization axis direction of the anisotropic dye film obtained in Example 7.

The transmittance characteristics of the dye film in absorption axis and polarization axis directions are shown in FIG. 6. Of the obtained anisotropic dye film, the maximum absorption wavelength ($\lambda$max) was 555 nm, and the dichroic ratio was 12.

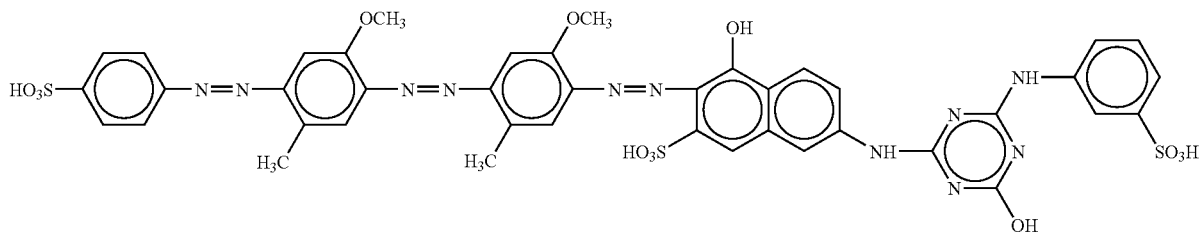

(I-1)

Example 8

5 Parts of the above dye No. (I-1) was added to 100 parts of water, followed by neutralization with a 5 wt % lithium hydroxide aqueous solution to bring the pH to 8.0, dissolution with stirring and filtration to obtain a dye aqueous solution. Further, 4 parts of boric acid was added to 96 parts of the dye aqueous solution to obtain a stain solution.

Separately, 10 parts of polyvinyl alcohol having an average degree of polymerization of 1,750 was added to 90 parts of water, followed by dissolution with stirring in water bath, developing to a thickness of 1 mm and drying to obtain a polyvinyl alcohol (PVA) film.

The PVA film was immersed in the stain solution and extended three times to obtain an anisotropic dye film. The tristimulus values of the dye film are as shown in Table 2, and the degree of polarization was 79.9%.

Example 9

5 Pars of the above dye No. (I-1) and 0.2 part of a nonionic surfactant EMULGEN 109P (manufactured by Kao Corporation) were added to 100 parts of water, followed by neutralization with a 5 wt % lithium hydroxide aqueous solution to bring the pH to 8.0, dissolution with stirring and filtration to obtain a dye aqueous solution.

The dye aqueous solution was coated on a glass substrate prepared in the same method as in Example 7, by a spin coater, followed by drying at room temperature to obtain an anisotropic dye film. The dichroic ratio of the obtained dye film was 20.

Example 10

25 Parts of the following dye No. (I-25) and 0.2 part of a nonionic surfactant EMULGEN 109P (manufactured by Kao Corporation) were added to 100 parts of water, followed by neutralization with a 5 wt % lithium hydroxide aqueous solution to bring the pH to 8.0, dissolution with stirring and filtration to obtain a dye aqueous solution.

The dye aqueous solution was observed by a polarization microscope in the same method as in Example 7, whereupon it was confirmed to be in a lyotropic liquid crystal state.

Further, the dye aqueous solution was coated on a glass substrate prepared in the same method as in Example 7, by blade coating, followed by drying at room temperature to obtain an anisotropic dye film.

Figure 7:
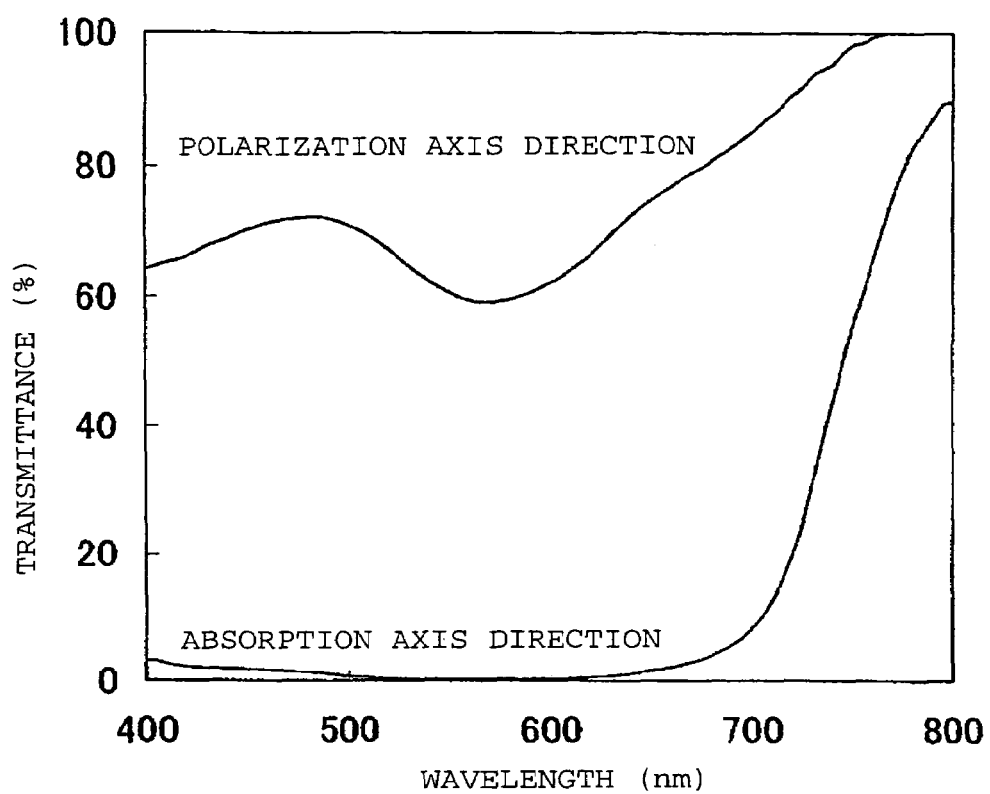
FIG. 7 is a graph illustrating light transmittances in an absorption axis direction and in a polarization axis direction of the anisotropic dye film obtained in Example 10.

The transmittance characteristics of the dye film in absorption axis and polarization axis directions are shown in FIG. 7. Of the obtained dye film, the maximum absorption wavelength ($\lambda$max) was 570 nm, and the dichroic ratio was 15.

Example 11

In the same manner as in Example 8 except that the dye was changed to the above dye No. (I-25), a dye aqueous solution was prepared and a PVA film was stained to obtain a dye film.

Of the obtained dye film, the tristimulus values are as shown in Table 2, and the degree of polarization was 64%.

TABLE 2

|  |  | X | Y | Z |
|---|---|---|---|---|
| Example 8 | Tristimulus values when two polarization axes of the dye film were laid in parallel with each other | 29.46 | 30.53403 | 43.21 |
|  | Tristimulus values when two polarization axes of the dye film were laid at right angles to each other | 8.16 | 6.74679 | 31.53 |
| Example 11 | Tristimulus values when two polarization axes of the dye film were laid in parallel with each other | 31.01 | 32.64696 | 46.75 |
|  | Tristimulus values when two polarization axes of the dye film were laid at right angles to each other | 12.77 | 13.68358 | 39.13 |

Example 12

5 Parts of sodium salt of the following dye No. (II-1) and 0.2 part of a nonionic surfactant EMULGEN 109P (manufactured by Kao Corporation) were added to 95 parts of water, followed by dissolution with stirring and filtration to obtain a dye aqueous solution (dye composition for an anisotropic dye film):

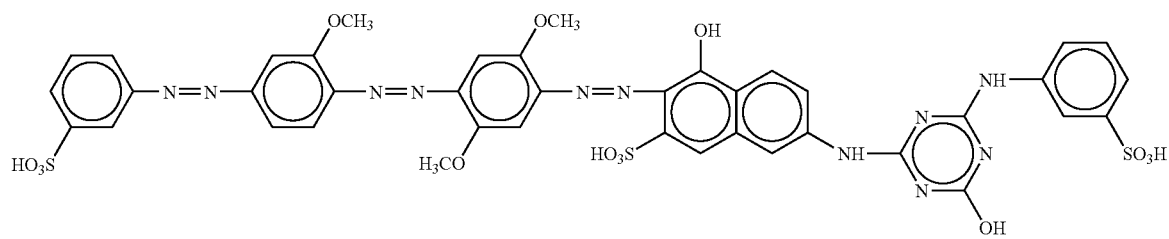

(I-25)

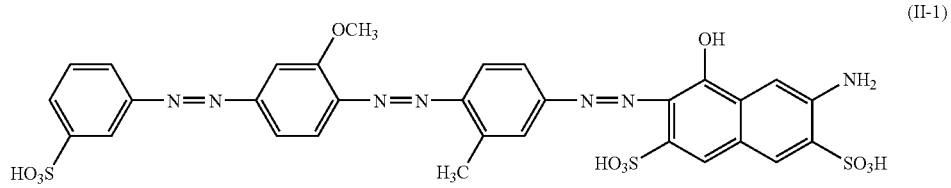

(II-1)

On the other hand, as a substrate, a glass substrate comprising a glass substrate and a polyimide alignment film formed on the glass substrate by spin coating (75 mm×25 mm, thickness 1.1 mm, polyimide alignment film having a polyimide film thickness of about 800 Å preliminarily subjected to rubbing treatment with cloth) was prepared. The dye aqueous solution was coated on the substrate thus prepared by a spin coater (CS-200, manufactured by Oshigane) (at 1,000 rpm for 5 seconds and then at 2,500 rpm for 15 seconds), followed by air drying to obtain an anisotropic dye film in which the dye molecules were aligned in the rubbing direction.

Of the obtained anisotropic dye film, the chromaticities x and y (CIE 1964 supplementary standard calorimetric system, under standard illuminant $D_{65}$) of the transmitted light (Tz) of the polarized light having a vibrating surface in the absorption axis direction in the dye film plane and the chromaticities x and y (CIE 1964 supplementary standard calorimetric system, under standard illuminant $D_{65}$) of the transmitted light (Ty) of the polarized light having a vibrating plane in the polarization axis direction in the dye film plane, the maximum absorption wavelength ($\lambda_{max}$) and the dichroic ratio (D) are shown in Table 3.

The obtained anisotropic dye film had a high dichroic ratio (light absorption anisotropy) with which it can sufficiently function as a polarizing film.

Example 13

In the same manner as in Example 12 except that the dye used was changed to sodium salt of the following dye No. (II-9), a dye composition for an anisotropic dye film was prepared, and coated on the similar substrate under the similar conditions to obtain an anisotropic dye film.

The chromaticities x and y (CIE supplementary standard calorimetric system), the maximum absorption wavelength ($\lambda_{max}$) and the dichroic ratio (D) of the obtained anisotropic dye film are shown in Table 3. The obtained anisotropic dye film was an anisotropic dye film having a high dichroic ratio with which it can sufficiently function as a polarizing film:

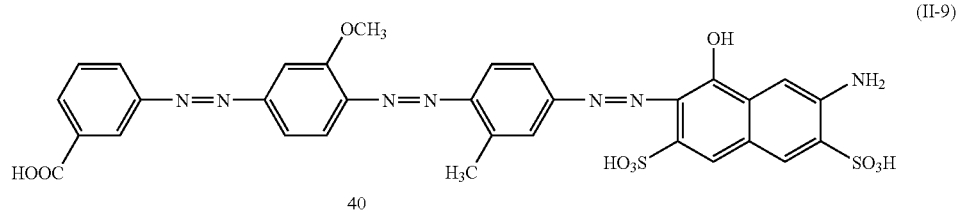

(II-9)

Example 14

10 Parts of sodium salt of the following dye No. (II-2) was added to 90 parts of water, followed by dissolution with stirring and filtration to obtain a dye composition for an anisotropic dye film. This dye composition was coated on the substrate used in Example 12 by a bar coater No. 3 (manufactured by TESTER SANGYO CO., LTD.), followed by air drying to obtain an anisotropic dye film.

The chromaticities x and y (CIE supplementary standard calorimetric system), the maximum absorption wavelength ($\lambda_{max}$) and the dichroic ratio (D) of the obtained anisotropic dye film are shown in Table 3. The obtained anisotropic dye film was an anisotropic dye film having a high dichroic ratio with which it can sufficiently function as a polarizing film:

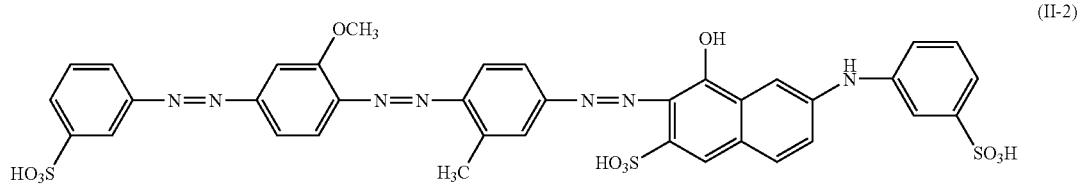

(II-2)

Example 15

10 Parts of sodium salt of the following dye No. (II-3) was added to 90 parts of water, followed by dissolution with stirring and filtration to obtain a dye composition for an anisotropic dye film. This dye composition was coated on the substrate used in Example 12 by an applicator with a gap of 10 μm (Imoto Machinery Co., Ltd.), followed by air drying to obtain an anisotropic dye film.

The chromaticities x and y (CIE supplementary standard colorimetric system), the maximum absorption wavelength ($\lambda_{max}$) and the dichroic ratio (D) of the obtained anisotropic dye film are shown in Table 3. The obtained anisotropic dye film was an anisotropic dye film having a high dichroic ratio with which it can sufficiently function as a polarizing film:

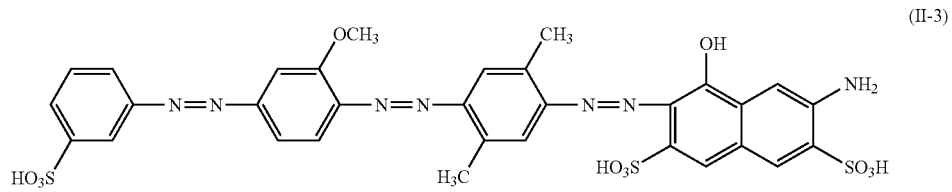

(II-3)

Example 16

9 Parts of sodium salt of the following dye No. (II-4) was added to 91 parts of water, followed by dissolution with stirring and filtration to obtain a dye composition for an anisotropic dye film. Coating was carried out under the same conditions as in Example 15 to obtain an anisotropic dye film.

The chromaticities x and y (CIE supplementary standard calorimetric system), the maximum absorption wavelength ($\lambda_{max}$) and the dichroic ratio (D) of the obtained anisotropic dye film are shown in Table 3. The obtained anisotropic dye film was an anisotropic dye film having a high dichroic ratio with which it can sufficiently function as a polarizing film:

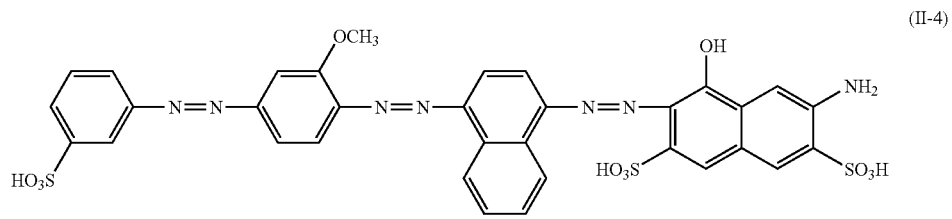

(II-4)

Example 17

7 Parts of sodium salt of the following dye No. (II-6) was added to 93 parts of water, followed by dissolution with stirring and filtration to obtain a dye composition for an anisotropic dye film. Coating was carried out under the same conditions as in Example 15 to obtain an anisotropic dye film.

The chromaticities x and y (CIE supplementary standard calorimetric system), the maximum absorption wavelength ($\lambda_{max}$) and the dichroic ratio (D) of the obtained anisotropic dye film are shown in Table 3. The obtained anisotropic dye film was an anisotropic dye film having a high dichroic ratio with which it can sufficiently function as a polarizing film:

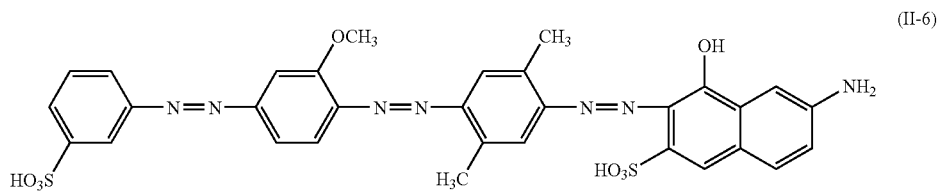

(II-6)

TABLE 3

| | | Tz | | Ty | | Dichroic | Wavelength | | Coating |
|---|---|---|---|---|---|---|---|---|---|
| Ex. | Dye | x | y | x | y | ratio | (nm) | Concentration | method |
| 12 | II-1 | 0.3368 | 0.3691 | 0.3164 | 0.3335 | 16.0 | 585 | 5% | Spin coating |
| 13 | II-9 | 0.3697 | 0.3920 | 0.3197 | 0.3356 | 15.5 | 585 | 5% | Spin coating |
| 14 | II-2 | 0.3878 | 0.3311 | 0.3345 | 0.3381 | 12.4 | 660 | 10% | Bar coating |
| 15 | II-3 | 0.3631 | 0.4334 | 0.3229 | 0.3358 | 21.4 | 605 | 10% | Applicator (10 μm) |
| 16 | II-4 | 0.3316 | 0.3788 | 0.3157 | 0.3335 | 9.2 | 470 | 9% | Applicator (10 μm) |
| 17 | II-6 | 0.5136 | 0.3688 | 0.3217 | 0.3355 | 15.8 | 580 | 7% | Applicator (10 μm) |

Comparative Example 2

In the same manner as in Example 8 except that a dye of the following structural formula was used instead of the above dye (I-1) to prepare a dye aqueous solution and a dye film:

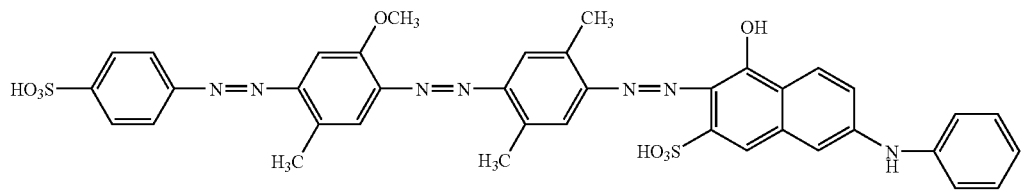

Figure 8:
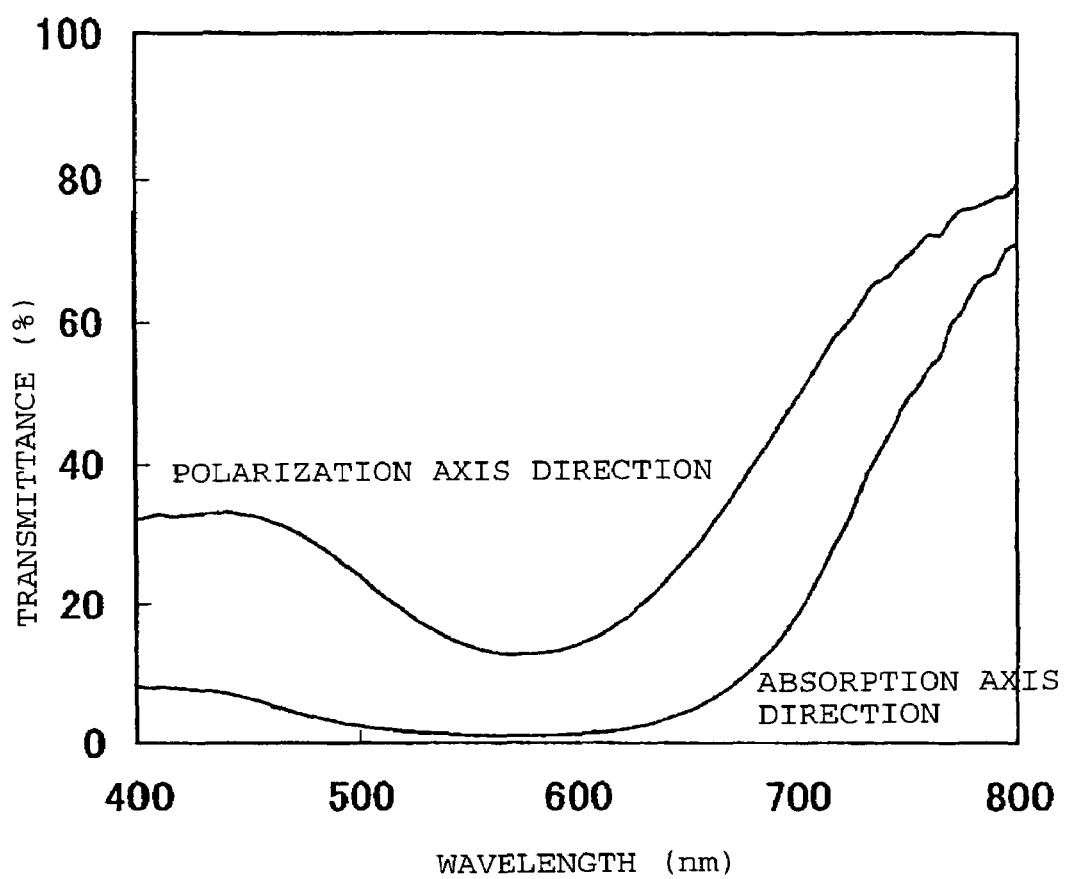
FIG. 8 is a graph illustrating light transmittances in an absorption axis direction and in a polarization axis direction of the anisotropic dye film obtained in Comparative Example 2.

The transmittance characteristics of the dye film in absorption axis and polarization axis directions are shown in FIG. 8. Of the obtained dye film, the maximum absorption wavelength (λmax) was 585 nm and the dichroic ratio was 3.

Comparative Example 3

In the same manner as in Example 12 except that sodium salt of a dye (III-1) having the substituent $G^1$ of the dye No. (II-1) at the para-position relative to the azo group was used instead of the above dye No. (II-1), a dye composition for a dye film was prepared, and coating was carried out on the similar substrate under the similar conditions to obtain a dye film.

With respect to the obtained dye film, various tests were carried out in the same manner as in Example 12. The results are shown in Table 4. The obtained dye film had a dichroic ratio (absorption anisotropy) of at most 2, and did not provide adequate anisotropy.

Comparative Example 4

In the same manner as in Example 12 except that the following dye (III-2) having the substituent $G^1$ of the dye No. (II-1) at the ortho-position was used instead of the above dye No. (II-1), a dye composition for a dye film was prepared, and coating was carried out on the similar substrate under the similar conditions to obtain a dye film.

With respect to the obtained dye film, various tests were carried out in the same manner as in Example 12. The results are shown in Table 4. The obtained dye film had a dichroic ratio (absorption anisotropy) of at most 2, and did not provide adequate anisotropy.

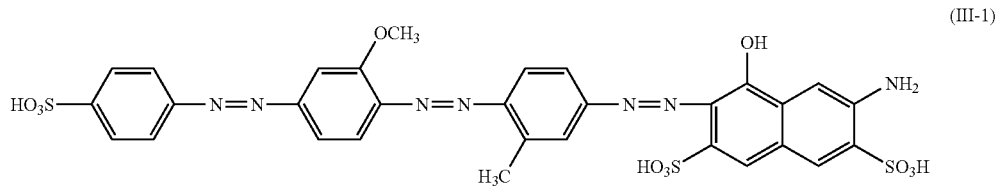

(III-1)

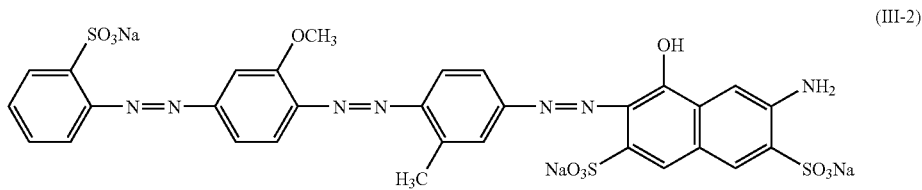

(III-2)

Comparative Example 5

5 Parts of the following dye No. (III-3) was added to 95 parts of water, followed by dissolution with stirring and filtration to obtain a dye composition for a dye film. This dye composition was coated on the substrate used in Example 12 by a bar coater No. 3 (manufactured by TESTER SANGYO CO., LTD.), followed by air drying to obtain an anisotropic dye film.

With respect to the obtained dye film, various tests were carried out in the same manner as in Example 12. The results are shown in Table 4. The obtained dye film had a dichroic ratio (absorption anisotropy) of at most 2, and did not provide adequate anisotropy.

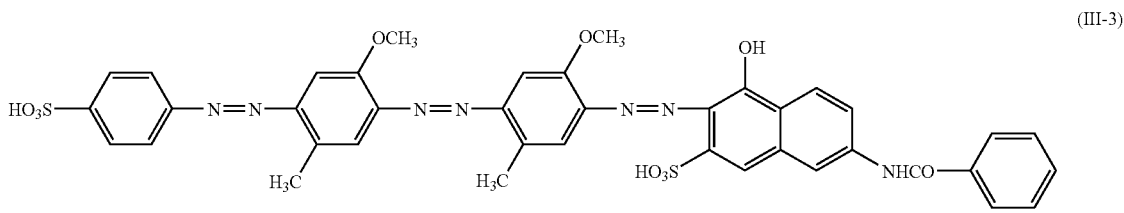

(III-3)

Comparative Example 6

In the same manner as in Example 12 except that the following dye (III-4) was used instead of the above dye No. (II-1), a dye composition for a dye film was prepared, and coating was carried out on the similar substrate under the similar conditions to obtain a dye film.

With respect to the obtained dye film, various tests were carried out in the same manner as in Example 12. The results are shown in Table 4. The obtained dye film had a dichroic ratio (absorption anisotropy) of at most 2, and did not provide adequate anisotropy.

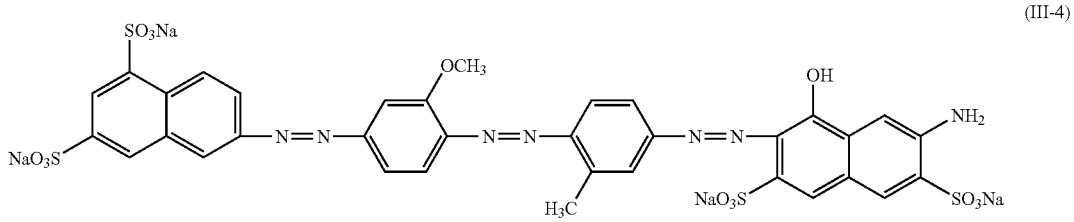

(III-4)

Comparative Example 7

In the same manner as in Example 12 except that sodium salt of the following dye (III-5) was used instead of the above dye No. (II-1), a dye composition for a dye film was prepared, and coating was carried out on the similar substrate under the similar conditions to obtain a dye film.

With respect to the obtained dye film, various tests were carried out in the same manner as in Example 12. The results are shown in Table 4. The obtained dye film had a dichroic ratio (absorption anisotropy) of at most 2, and did not provide adequate anisotropy.

The excitation purity of the dye (dye aqueous solution) of the present Example was at most 12%. Further, the excitation purity of the anisotropic dye film prepared by using this dye was also at most 12%, and the anisotropic dye film was useful as a low chromaticness achromatic anisotropic dye film.

Example 19

The excitation purities of the dyes used in Examples 13 to 17 and the anisotropic dye films obtained in Examples 13 to 17, were measured and calculated in the same manner as in

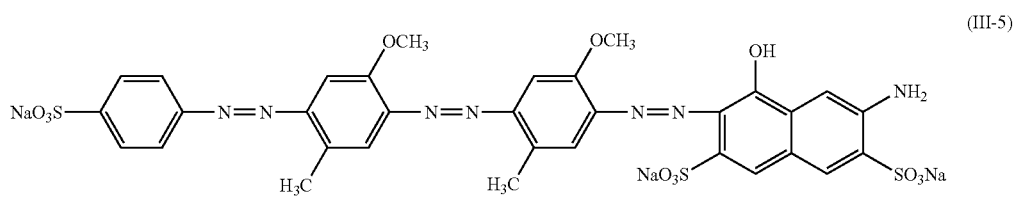

(III-5)

TABLE 4

| Comp. Ex. | Dye | Tz x | Tz y | Ty x | Ty y | Dichroic ratio | Wavelength (nm) | Concentration | Coating method |
|---|---|---|---|---|---|---|---|---|---|
| 3 | III-1 | 0.3209 | 0.3326 | 0.3092 | 0.3285 | 1.8 | 500 | 5% | Spin coating |
| 4 | III-2 | 0.3312 | 0.3512 | 0.3285 | 0.3483 | 1.2 | 600 | 5% | Spin coating |
| 5 | III-3 | 0.1861 | 0.1790 | 0.2132 | 0.2021 | 1.8 | 690 | 5% | Bar coating |
| 6 | III-4 | 0.3224 | 0.3480 | 0.3204 | 0.3461 | 1.2 | 560 | 5% | Spin coating |
| 7 | III-5 | 0.3248 | 0.3532 | 0.3256 | 0.3535 | 1.0 | 600 | 5% | Spin coating |

(4) Excitation Purity (Examples 18 and 19)

Example 18

0.1 Part of sodium salt of the above dye No. (II-1) was added to 99.9 parts of water, followed by dissolution with stirring and filtration to obtain a dye aqueous solution. The aqueous solution was injected into a quartz cell (cuvette) having an optical path length of 0.1 mm. The visible light transmittance of each of the dye aqueous solution injected in the cuvette and the anisotropic dye film obtained in Example 12 was measured by a spectrophotometer to calculate the chromaticities x and y in the CIE 1964 supplementary standard calorimetric system under standard illuminant $D_{65}$.

Further, the chromaticity coordinates N of the standard illuminant $D_{65}$, and each of the chromaticity coordinates C1 of the obtained dye aqueous solution and chromaticity coordinates C2 of the anisotropic dye film, in the chromaticity diagram, were connected with a straight line, and wavelengths corresponding to the intersection points of extensions of the respective straight lines and the spectral locus were taken as the dominant wavelengths, and from the proportions at the respective points, the excitation purity (pe1) of the dye aqueous solution and the excitation purity (pe2) of the anisotropic dye film were calculated. The excitation purity of the dye aqueous solution and the excitation purity of the anisotropic dye film are shown in Table 5.

Example 18. The excitation purities of the aqueous solutions of the dyes and the excitation purities of the anisotropic dye films are shown in Table 5.

The excitation purities of the dyes (dye aqueous solutions) of the present Example were at most 12%. Further, the excitation purities of the anisotropic dye films prepared by using these dyes were also at most 12%, and the anisotropic dye films were useful as low chromaticness achromatic anisotropic dye films.

TABLE 5

| Dye (Ex.) | Excitation purity of dye aqueous solution (pe1) | Excitation purity of anisotropic dye film (pe2) |
|---|---|---|
| II-1 (Ex. 12) | 2.4% | 7.2% |
| II-9 (Ex. 13) | 5.6% | 5.6% |
| II-2 (Ex. 14) | 6.5% | 8.5% |
| II-3 (Ex. 15) | 4.1% | 7.4% |
| II-4 (Ex. 16) | 11.0% | 5.8% |
| II-6 (Ex. 17) | 8.1% | 7.1% |

INDUSTRIAL APPLICABILITY

According to the present invention, an anisotropic dye film having high dichromatic properties can be provided. Further, by using the anisotropic dye film having high dichromatic properties, a polarizing element excellent in heat resistance and light fastness and further excellent in polarizing performance can be provided.

The present application is based on a Japanese Patent Application No. 2003-353832 (filed on Oct. 14, 2003), a Japanese Patent Application No. 2003-378399 (filed on Nov. 7, 2003) and a Japanese Patent Application No. 2004-234415 (filed on Aug. 11, 2004), and the entire disclosures thereof are hereby included by reference.

What is claimed is:

1. An anisotropic dye film comprising a molecularly stacked dye wherein a period attributable to molecular stacking is at most 3.445 Å, and a column length thereof is at least 105 Å.

2. The anisotropic dye film according to claim 1, wherein the degree of orientation of the molecular stacking axes is at least 85%.

3. The anisotropic dye film according to claim 1, wherein a film thickness is at most 30 μm.

4. The anisotropic dye film according to claim 1, wherein the anisotropic dye film is formed on a substrate.

5. The anisotropic dye film according to claim 4, wherein the anisotropic dye film is formed by a wet film-forming method.

6. The anisotropic dye film according to claim 4, wherein the substrate is glass or a resin film.

7. The anisotropic dye film according to claim 1, wherein a protective layer is further formed.

8. The anisotropic dye film according to claim 1, comprising an azo dye, wherein the azo dye is represented in the free acid form by the following formula (1):

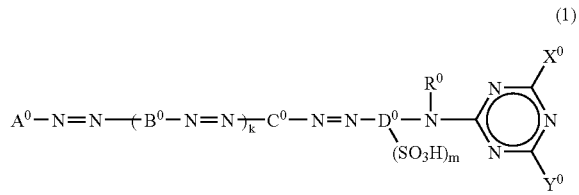

wherein
A⁰ represents a phenyl group or a naphthyl group, either of which may have one or more substituents selected from the group consisting of a sulfo group, a carboxyl group, a hydroxyl group and an amino group,
B⁰, C⁰ and D⁰ independently of one another represent aromatic hydrocarbon rings having a carbon number of from about 6 to about 20, which may have one or more substituents selected from the group consisting of an alkyl group, an alkoxy group, and an acylamino group,
R⁰ represents a hydrogen atom or an optional substituent,
each of X⁰ and Y⁰ independently of each other, represents an optional substituent other than a halogen atom,
k represents 1 or 2, and m represents 1 or 2, provided that when k is 2, the plurality of B⁰ contained in one molecule may be the same or different.

9. The anisotropic dye film according to claim 8, wherein the azo dye, in the free acid form is represented by the following formula (1-a):

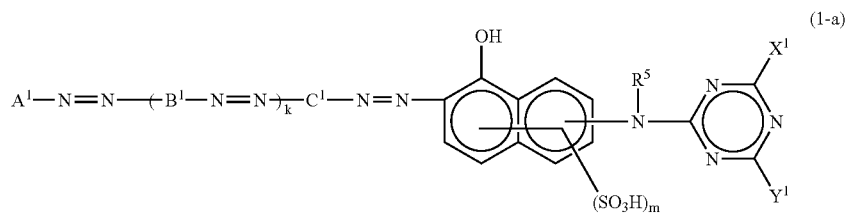

wherein
A¹ represents a phenyl group or a naphthyl group which may have one or more substituents selected from the group consisting of a sulfo group, a carboxyl group, a hydroxyl group and an amino group,
each of B¹ and C¹ independently of each other, represents a phenylene group or a naphthylene group either of which may have one or more substituents selected from the group consisting of an alkyl group, an alkoxy group and an acylamino group,
R⁵ represents a hydrogen atom or a $C_{1-5}$ alkyl group which may have a substituent,
each of X¹ and Y¹ independently of each other, represents a —NR¹R² group, a —OR³ group or a —SR⁴ group,
provided that each of R¹, R², R³ and R⁴ independently of one another, represents a hydrogen atom, a $C_{1-8}$ alkyl group which may have a substituent, a $C_{2-18}$ alkenyl group which may have a substituent, a $C_{3-5}$ hydrocarbon ring group which may have a substituent, or a heterocyclic group consisting of a 5- or 6-membered monocyclic ring or a condensed ring of two or three such monocyclic rings, which may have a substituent, or R¹ and R² may be mutually bonded to form a 5- or 6-membered ring containing a nitrogen atom, and the ring formed by bonding of R¹ and R², may have a substituent,
k represents 1 or 2, and m represents 1 or 2, provided that when k is 2, the plurality of B¹ contained in one molecule, may be the same or different.

10. The anisotropic dye film according to claim 1, comprising an azo dye, wherein the azo dye is represented in the free acid form by the following formula (2):

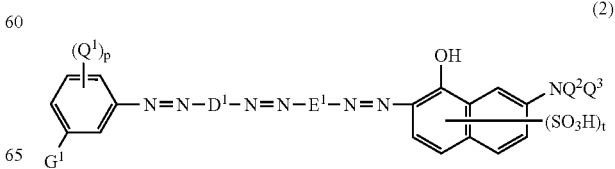

wherein each of $D^1$ and $E^1$ independently of each other, represents a phenylene group which is optionally substituted, or a naphthylene group which is optionally substituted, wherein the phenylene group is optionally substituted with a group of low polarity, and the naphthylene group is optionally substituted with a group of low polarity, $G^1$ represents a carboxyl group, a sulfo group or a phosphonic group, $Q^1$ represents a halogen atom, a hydroxyl group, a nitro group, an amino group which is optionally substituted, a $C_{1-4}$ alkyl group which is optionally substituted, a $C_{1-3}$ alkoxy group which is optionally substituted, a carboxyl group or a sulfo group, each of $Q_2$ and $Q^3$ independently of each other, represents a hydrogen atom, a $C_{1-4}$ alkyl group which is optionally substituted, or a phenyl group which is optionally substituted, p represents 0 or 1, and t represents 1 or 2.

11. An azo dye, of which the free acid form is represented by the following formula (1):

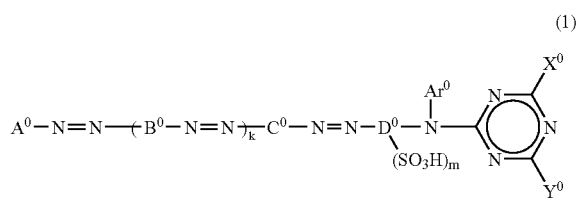

(1)

wherein $A^0$ represents a phenyl group or a naphthyl group, either of which may have one or more substituents selected from the group consisting of a sulfo group, a carboxyl group, a hydroxyl group and an amino group, $B^0$, $C^0$ and $D^0$ independently of one another represent aromatic hydrocarbon rings having a carbon number of from about 6 to about 20, which may have one or more substituents selected from the group consisting of an alkyl group, an alkoxy group and an acylamino group, $R^0$ represents a hydrogen atom or an optional substituent, each of $X^0$ and $Y^0$ which are independent of each other, represents an optional substituent other than a halogen atom, k represents 1 or 2, and m represents 1 or 2, provided that when k is 2, the plurality of $B^0$ contained in one molecule may be the same or different.

12. The azo dye according to claim 11, wherein the free acid form is represented by the following formula (1-a):

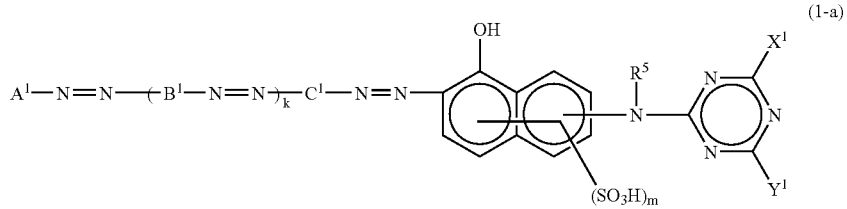

(1-a)

wherein $A^1$ represents a phenyl group or a naphthyl group which may have one or more substituents selected from the group consisting of a sulfo group, a carboxyl group, a hydroxyl group and an amino group, each of $B^1$ and $C^1$ independently of each other, represents a phenylene group which may have a substituent, or a naphthylene group, either of which may have one or more substituents selected from the group consisting of an alkyl group, an alkoxy group and an acylamino group, $R^5$ represents a hydrogen atom or a $C_{1-5}$ alkyl group which may have a substituent, each of $X^1$ and $Y^1$ independently of each other, represents a $-NR^1R^2$ group, a $-OR^3$ group or a $-SR^4$ group, provided that each of $R^1$, $R^2$, $R^3$ and $R^4$ independently of one another, represents a hydrogen atom, a $C_{1-18}$ alkyl group which may have a substituent, a $C_{2-18}$ alkenyl group which may have a substituent, a $C_{3-15}$ hydrocarbon ring group which may have a substituent, or a heterocyclic group consisting of a 5- or 6-membered monocyclic ring or a condensed ring of two or three such monocyclic rings, which may have a substituent, or $R^1$ and $R^2$ may be mutually bonded to form a 5- or 6-membered ring containing a nitrogen atom, and the ring formed by bonding of $R^1$ and $R^2$, may have a substituent, k represents 1 or 2, and m represents 1 or 2, provided that when k is 2, the plurality of $B^1$ contained in one molecule, may be the same or different.

13. The azo dye according to claim 11, which has a molecular weight of from 500 to 5,000.

14. An azo dye for an anisotropic dye film to be formed by a wet film-forming method, wherein the azo dye in the free acid form is represented by the following formula (2):

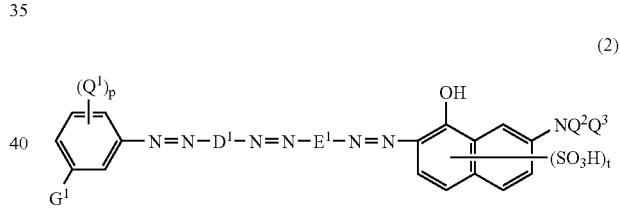

(2)

wherein each of $D^1$ and $E^1$ independently of each other, represents a phenylene group which is optionally substituted, or a naphthylene group which is optionally substituted, wherein the phenylene group is optionally substituted with a group of low polarity, and the naphthylene group is optionally substituted with a group of low polarity, $G^1$ represents a carboxyl group, a sulfo group or a phosphonic group, $Q^1$ represents a halogen atom, a hydroxyl group, a nitro group, an amino group which is optionally substituted, a $C_{1-4}$ alkyl group which is optionally substituted, a $C_{1-3}$ alkoxy group which is optionally substituted, a carboxyl group or a sulfo group, each of $Q^2$ and $Q^3$ which are independent of each other, represents a hydrogen atom, a $C^{1-4}$ alkyl group which is optionally substituted, or a phenyl group which is optionally substituted, p represents 0 or 1, and t represents 1 or 2.

15. The azo dye according to claim 14, wherein the dye has an excitation purity of from 0 to 12%.

16. A dye composition for an anisotropic dye film, comprising the azo dye as defined in claim 11.

17. An anisotropic dye film, comprising the azo dye as defined in claim 11.

18. An anisotropic dye film formed by using the dye composition for an anisotropic dye film as defined in claim 16.

19. A polarizing element comprising the anisotropic dye film as defined in claim 1.

20. A dye composition for an anisotropic dye film, comprising the azo dye as defined in claim 14.

21. An anisotropic dye film, comprising the azo dye as defined in claim 14.

22. An anisotropic dye film formed by using the dye composition for an anisotropic dye film as defined in claim 20.

23. A polarizing element comprising the anisotropic dye film as defined in claim 17.

24. A polarizing element comprising the anisotropic dye film as defined in claim 18.

25. A polarizing element comprising the anisotropic dye film as defined in claim 21.

26. A polarizing element comprising the anisotropic dye film as defined in claim 22.

* * * * *